(12) United States Patent
Stoyles et al.

(10) Patent No.: US 10,210,648 B2
(45) Date of Patent: Feb. 19, 2019

(54) EMOJICON PUPPETING

(71) Applicant: Apple Inc., Cupertino, CA (US)

(72) Inventors: Justin D. Stoyles, San Francisco, CA (US); Alexandre R. Moha, Los Altos, CA (US); Nicolas V. Scapel, Sunnyvale, CA (US); Guillaume P. Barlier, San Mateo, CA (US); Aurelio Guzman, San Jose, CA (US); Bruno M. Sommer, Sunnyvale, CA (US); Nina Damasky, Santa Clara, CA (US); Thibaut Weise, Menlo Park, CA (US); Thomas Goossens, Paris (FR); Hoan Pham, San Jose, CA (US); Brian Amberg, Zurich (CH)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/809,875

(22) Filed: Nov. 10, 2017

(65) Prior Publication Data

US 2018/0336714 A1  Nov. 22, 2018

Related U.S. Application Data

(60) Provisional application No. 62/507,073, filed on May 16, 2017, provisional application No. 62/556,368, filed on Sep. 9, 2017.

(51) Int. Cl.
*G06K 9/00* (2006.01)
*G06T 13/40* (2011.01)
*H04N 7/14* (2006.01)

(52) U.S. Cl.
CPC .......... *G06T 13/40* (2013.01); *G06K 9/00228* (2013.01); *G06K 9/00302* (2013.01); *H04N 7/147* (2013.01); *H04N 2007/145* (2013.01)

(58) Field of Classification Search
CPC .......... G06T 13/00–13/80; G06T 7/20; G06T 2207/30196; G06K 9/00221–9/00315;
(Continued)

(56) References Cited

U.S. PATENT DOCUMENTS

| 2011/0037767 A1* | 2/2011 | Casanova | H04L 51/10 345/473 |
| 2013/0147788 A1* | 6/2013 | Weise | G06T 13/40 345/419 |

(Continued)

FOREIGN PATENT DOCUMENTS

WO  WO-2018128996 A1 *  7/2018  ............. G06T 13/00

OTHER PUBLICATIONS

Extended European Search Report from European Patent Application No. 18151014.0, dated Aug. 7, 2018, 8 pages.

*Primary Examiner* — Daniel F Hajnik
(74) *Attorney, Agent, or Firm* — Morgan, Lewis & Bockius LLP

(57) ABSTRACT

Systems and methods for generating a video of an emoji that has been puppeted using inputs from image, depth, and audio. The inputs can capture facial expressions of a user, eye, eyebrow, mouth, and head movements. A pose, held by the user, can be detected that can be used to generate supplemental animation. The emoji can further be animated using physical properties associated with the emoji and captured movements. An emoji of a dog can have its ears move in response to an up-and-down movement, or a shaking of the head. The video can be sent in a message to one or more recipients. A sending device can render the puppeted video in accordance with hardware and software capabilities of a recipient's computer device.

18 Claims, 14 Drawing Sheets

(58) Field of Classification Search
CPC .......... G06K 9/00335; G06K 9/00845; H04M 1/72544; H04M 1/72555; G09K 2009/00322; G09K 2009/00328
See application file for complete search history.

(56) References Cited

U.S. PATENT DOCUMENTS

| | | | |
|---|---|---|---|
| 2013/0278607 A1* | 10/2013 | Twigg | G06T 13/80 345/473 |
| 2014/0063236 A1* | 3/2014 | Shreve | G06K 9/00228 348/143 |
| 2014/0085315 A1* | 3/2014 | Koperwas | G06T 13/20 345/474 |
| 2014/0361974 A1* | 12/2014 | Li | G06F 3/005 345/156 |
| 2015/0201161 A1* | 7/2015 | Lachapelle | H04N 7/15 348/14.07 |
| 2016/0134677 A1* | 5/2016 | Mueller | H04L 65/602 709/219 |
| 2016/0198012 A1* | 7/2016 | Fablet | H04L 65/4084 709/231 |
| 2017/0019446 A1* | 1/2017 | Son | H04L 65/601 |
| 2017/0098122 A1* | 4/2017 | el Kaliouby | A61B 5/744 |
| 2017/0213269 A1* | 7/2017 | Setlur | G06Q 30/0613 |
| 2018/0005015 A1* | 1/2018 | Hou | G01S 13/86 |
| 2018/0047200 A1* | 2/2018 | O'Hara | G06T 13/40 |

* cited by examiner

EMOJICON PUPPETING

RELATED APPLICATIONS

This application claims priority of U.S. Provisional Patent Application Ser. No. 62/507,073 to Justin D. Stoyles, entitled "Emojicon Puppeting," filed May 16, 2017, and U.S. Provisional Patent Application Ser. No. 62/556,368 to Justin D. Stoyles, entitled "Emojicon Puppeting," filed Sep. 9, 2017, each of which is hereby incorporated by reference to the extent that it is consistent with this application.

This application is related to U.S. patent application Ser. No. 15/275,136 entitled "Messaging Application Interacting with One or More Extension Applications," filed Sep. 23, 2016, U.S. patent application Ser. No. 15/399,203, entitled "Conversion of Detected URL in Text Message," filed Jan. 5, 2017, U.S. Patent Application Ser. No. 62/349,108 entitled "Conversion of Detected URL in Text Message," filed Jun. 12, 2016, U.S. patent application Ser. No. 14/341,860 entitled "Overlapping Pattern Projector," filed Jul. 28, 2014 to Jacob R. Stern, published as U.S. Patent Publication No. 2016/0025993, U.S. patent application Ser. No. 12/840,312 entitled, "Optical Pattern Projection," filed Jul. 21, 2010 to Alexander Shpunt, issued as U.S. Pat. No. 8,384,997, U.S. patent application Ser. No. 13/567,095 entitled "Projectors of Structured Light," to Benny Pesach, issued as U.S. Pat. No. 8,749,796, and U.S. patent application Ser. No. 13/810,451 entitled "Scanning Projectors and Image Capture Modules for 3D Mapping," to Alexander Shpunt, filed Jan. 16, 2013, issued as U.S. Pat. No. 9,098,931, each of which is hereby incorporated by reference to the extent that it is consistent with this application.

TECHNICAL FIELD

This disclosure relates to the field of emoji images.

BACKGROUND

An emoji is a small graphic or icon that can convey an expression or an emotion, such as a smiley face that conveys happiness or a kiss that conveys affection. A user of a messaging system may include an emoji in a message to express the emotion conveyed by the emoji. An emoji may have a fixed animation, such as the emoji winking an eye, or blowing a kiss. However, a user cannot alter the fixed animation of the emoji.

Some animation and augmented reality (AR) systems can add objects to an image. For example, an AR system may add a funny nose to a picture of a person, or morph a picture of one person, such as the user, into a picture of another person, such as a famous actor or public figure. These systems typically use camera output (e.g. RGB data) to determine contours of the person to provide the data to perform the morphing. Using only RGB data for depth information can be problematic in low-light conditions.

SUMMARY OF THE DESCRIPTION

Systems and methods are disclosed for generating a video of a puppeted emoji from image, depth, and optionally audio information, recorded of the facial expressions, head movements, and speech of a user of a client device. The puppeted emoji video can be transmitted via a message to one or more message recipients. The puppeted emoji can be animated or puppeted using recorded expressions and movements and speech.

In a first embodiment, a method of generating a video of a puppeted emoji, for transmission in a message to one or more receiving client devices, can be generated from within a messaging application using an emoji puppeting application extension of the messaging application. The puppeted emoji can appear to mimic the facial expressions, head movements, eyebrow movements, speech, and other expressions of a user of the client device. The method can include receiving a plurality of frames of depth information representing an object, such as a human head and face, using a depth sensor. An object can also be, for example, the head or face of a user's pet, or other moving, expressive object. The method can further include receiving a plurality of frames of image information representing the object. The video of the puppeted emoji can be rendered in accordance with the plurality of frames of depth information and image information. In an embodiment, the video can further include audio, generated from a plurality of frames of audio data recorded contemporaneously with the plurality of frames of images and depth information. Then the message, with puppeted emoji video, can be transmitted to one or more message recipients, via a messaging service. The messaging recipients can each have a computing device having different device and messaging capabilities. In an embodiment, the messaging application on the sending client device can receive, from a messaging system, an indication of one or more versions or formats to transmit the video of the emoji, corresponding to device and messaging application capabilities of one or more devices of the message recipients. In an embodiment, the emoji video can be transmitted in a message using either a rich link or a metadata tag that indicates playback parameters of the emoji video. A rich link can indicate a uniform resource locator (URL), uniform resource indicator (URI), or other reference to access the rendered puppeted emoji. The rich link, or the metadata tag, can include parameters for playback of the puppeted emoji, such as a number of times to playback the puppeted emoji, a delay time before repeating the playback, whether to loop playback or playback the puppeted emoji once, whether or not the puppeted emoji should auto-play upon a recipient opening the message containing the puppeted emoji or wait until the puppeted emoji is clicked, and other playback parameters of the puppeted emoji. In an embodiment, the client sending device can store the rendered puppeted emoji video and the rich link can refer to a location that the rendered video is stored. The location can be the sending device, the message server, a third party server, cloud storage, or other storage location. A receiving client can access the puppeted emoji video by accessing the rich link. Alternatively, the puppeted emoji video can be embedded in the message and transmitted to the recipient for playback in a default manner indicated by the receiving device, message application or set-up parameters.

In another embodiment, a message system can receive an indication from a sending client device that a message that includes a puppeted emoji video is to be sent to a plurality of message recipients. The message system can determine the device capabilities of the sending client device. The message system can further determine device capabilities of the client device of each of the message recipients. The message system can then transmit to the sending client device a list of versions or formats to render the puppeted emoji video so that each receiving client device can play the video in accordance with the client device hardware and software capabilities. The rendered puppeted emoji version can further take into account the hardware and software capabilities of the sending client device to render the puppeted emoji video. The message system can additionally receive messages, to each of the message recipients, each message containing a version of the puppeted emoji video from the sending client device as specified by the message system. The message system can transmit the message and puppeted emoji video to each message recipient in a version that is appropriate for the hardware and software capabilities of the receiving client device. The message system can then notify the sending client device that the messages have been successfully sent to the recipient client devices.

In yet another embodiment, a receiving client device can receive a message from a message system, the message including a puppeted emoji. In an embodiment, a messaging application of the receiving client device can decrypt the message. The message can be decrypted using a private key of an asymmetric key pair of the recipient of the message. In an embodiment, the message can be decrypted using a symmetric key. Text within the message can be displayed within a message session in a transcript window within the messaging application. If the receiving client device has an emoji puppeting application extension installed thereon, the message application display and loop the puppeted emoji from the message. In response to a user input, audio from the puppeted emoji can be turned on or muted. If the receiving client device does not include an emoji puppeting application extension, then the puppeted emoji can be displayed as a video on the display of the receiving client device. In an embodiment, the video can be displayed within a transcript window of the message application. In an embodiment, the video can be replayed in response to a user input to replay the video.

In a further embodiment, an emoji puppeting application extension can call, via one or more application programming interfaces (API) or frameworks, an augmented reality (AR) API, an audio/visual API, a rendering AP, face tracking API, and an emoji puppeting API to perform puppeting of an emoji. Face tracking API can receive image sensor data and depth sensor data and generate a base mesh of a head and/or face of the user. The image sensor can be used to detect the presence of the user's face. In an embodiment, either, or both, the image sensor and depth sensor can be used to detect the presence of the user's face. In an embodiment, the depth sensor can be powered off during detection of the user's face. In an embodiment, a bounding box can be displayed that surrounds the user's detected face and a hardware signal can be generated indicating that the user's face has been detected. After the user's face has been detected, the depth sensor can be used to scan the user's face and generate a base mesh or a "profile" face. In an embodiment, the depth sensor can be powered on in response to the user's face being detected by the RGB sensor. In an embodiment, the depth sensor can be powered off if a user's face is no longer detected. As the user changes her facial expression, face tracking API can continue to receive frames of image and depth sensor data and can determine differences between the base mesh and additional frames of image and depth sensor data. The differences can be expressed as a 3D vector with each vector element having a value, such as 0 . . . 255, at each vertice of the base mesh. In an embodiment, different vertices in the base mesh, such the mouth or eyebrow of the user, can be tracked, wherein each vertex can be termed a landmark. Differences between the base mesh and additional frames of image and depth sensor data can be expressed as one or more blend shape values that represent the changes in the user's facial expressions. The base mesh, and sequences of blend shapes derived from frames of image and depth sensor data can be used to map blend shape values of the base mesh, to blend shape values of an emoji. In an embodiment changes to blend shape values of the base mesh, mapped to the blend shapes of the emoji, can be used to animate or "puppet" the emoji. The animated emoji can be rendered into a video, in one or more formats, using a rendering API.

In an embodiment a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above. In an embodiment, the processing system includes at least one hardware processor.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
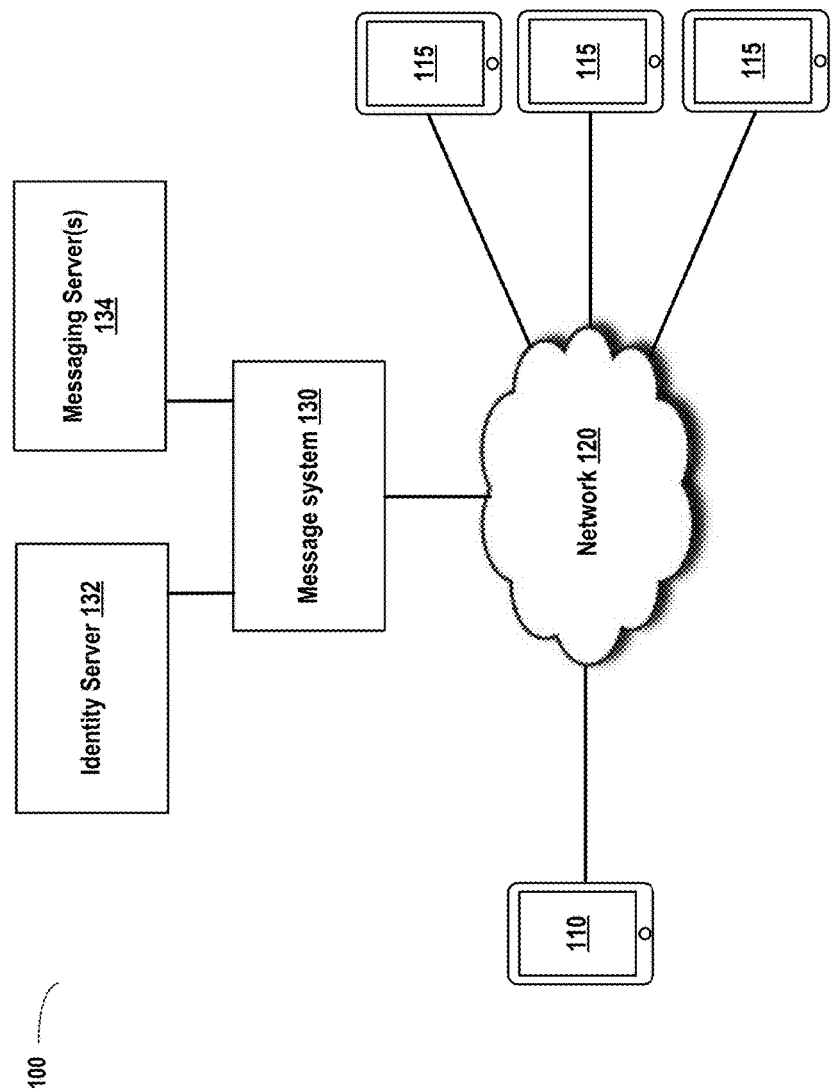
FIG. 1 illustrates, in block form, an overview of a system for generating and sending a message with a puppeted emoji, according to some embodiments.

FIG. 1 illustrates, in block form, an overview of a system 100 for generating and sending a message with a puppeted emoji, according to some embodiments. The system 100 can include one or more sending client devices 110 in communication with one or more recipient client devices 115 and a message system 130, via a network 120.

Sending client device 110 can include a messaging application that enables a user to compose and send messages to one or more message recipients each having a receiving client device 115. A message can be any type of message including a text message, SMS message, MIME format message, email, or other message type. Sending client device 110 can further include an emoji puppeting application extension that enables the user to include a puppeted emoji within a message. A puppeted emoji is an emoji that has been animated or controlled by user input, as described herein. User input can include capturing facial expressions, head movements, and/or speech of a user. The puppeted emoji can also receive special graphical features that include movements derivable from the user inputs. For example, if the emoji is an eagle, and the user moves her arms, the emoji animation can include the eagle moving its wings. If the emoji is a dog, and the user moves his head from side-to-side, the dog's ears and fur can be animated to move in response to the user's head movements.

Client device 110 can include an image sensor, depth sensor, and audio recording hardware. In an embodiment, the depth sensor can detect both depth and image data. Image data can be color data such as but not limited to red-green-blue (RGB) image data. Depth data can include a distance from an image sensor. In an embodiment, a depth sensor can include an infrared laser. In an embodiment, image data an be obtained using a camera, or other charge-coupled device (CCD).

Client device 110 can further include a processing system having at least one hardware processor, coupled to the depth sensor, image sensor, and audio hardware. Depth, image, and audio data can be synchronized in time as frames of data. Depth and image data can be used to generate a graphical mesh representing at least the face and/or head of the user as well as other body parts of the user such as neck, arms, hands, and so forth. The emoji can have vertices or "landmarks" that are mapped to one or more vertices of the mesh generated from the image and depth information. Blend shape values for one or more expressions of the user's tracked face can be generated that map to one or more emoji blend shapes to animate the emoji in accordance with the user's face, expressions, body movements, and head movements. The process of acquiring user movements and translating these movements to the emoji is termed "puppeting" the emoji.

Client device 110 can generate a video of the puppeted emoji using any video encoding standards, such as but not limited to any MPEG standard, H.264, or H.265. Depending upon hardware and software capabilities of the receiving client devices 115 of the message recipients, the sending client device 110 can generate an appropriate version of the puppeted emoji that is optimized for the capabilities of the receiving client device 115. A sending client device 110 messaging application 280 (not shown) can send a list of message recipients to a message system 130. Message system 130 can look up a receiving client device 115 of each message recipient. Message system 130 can determine hardware and software capabilities of each receiving client device 115 and send a message to the sending client device 110 with the list of message recipients and an indication of how the puppeted emoji should be rendered, and how the sending message should be prepared, to be optimal for each recipient's receiving client device 115 hardware and software capabilities. In an embodiment, message system 130 can look up each recipient in a database and determine a make and model of receiving client device 115 registered to the recipient. Determining hardware capabilities can include determining processor type and speed, available memory, and display specifications including pixel resolution and a number of bits per pixel used to represent color for each pixel. Determining software capabilities can include determining a version of an operating system of the receiving client device 115, determining whether the receiving client device 115 contains software that supports puppeted emojis, and determining a version of a message application 280 on the receiving client device 115. If the recipient is not registered with the message system 130, or the make and model of the recipient's receiving client device 115 is not found or is otherwise unknown, then message system 130 can use a default set of hardware and software capabilities for the recipient receiving client device 115. Default characteristics can include a default pixel resolution of the display, a default number of bits of color information for each pixel, and that the receiving client device 115 does not have the puppeted emoji application extension 270 (not shown) installed. Based on the hardware and software capabilities for each message recipient receiving client device 115, message server can determine rendering parameters for puppeted emoji video, such as resolution, frame rate, and color depth. Message system 130 can prepare a message to sending client device 110 indicating, for each message recipient, the rendering parameters for the sending client device 110 to use to render the puppeted emoji video, and whether the recipient's receiving client device 115 has the puppeted emoji application extension installed. The message system 130 can send the message to the sending client device 110. Sending client device 110 can then render the puppeted emoji video for each message recipient's receiving client device in accordance with the rendering parameters for each message recipient. For each recipient, sending client device 110 can package any message text that may accompany the puppeted emoji video, along with the appropriate version of the rendered puppeted emoji video for the message recipient's receiving client device, into a message. If the recipient's receiving client device 115 has the puppeted emoji application extension 270 installed, then sending client device 110 can further include a rich link to the puppeted emoji video in the message to the recipient. In an embodiment, the client sending device can store the rendered puppeted emoji video and the rich link can refer to a location that the rendered video is stored. The location can be the sending device, the message server, a third party server, cloud storage, or other storage location. A receiving client device 115 can access the puppeted emoji video by accessing the rich link. In an embodiment, the sending client device 110 can alternatively include a metadata tag with the puppeted emoji video that indicates parameters for playback of the puppeted emoji video. Sending client device 110 can optionally encrypt the message using an encryption key that is associated with the recipient. In an embodiment, the encryption key can be a public key of an asymmetric key pair. In an embodiment, the encryption key can be a symmetric key.

Client device(s) 115 can include the same, similar, or different software and hardware capabilities as the sending client device 110. Similarity and differences between hardware and software of sending 110 and receiving 115 client devices can include whether the devices have the same manufacturer (e.g. Apple® or Android® devices), whether the devices subscribe to a same messaging system 130, e.g. Apple® iMessage®, whether the message system 130 has access to the hardware and software device capabilities of sending 110 and receiving devices 115, and whether the sending 110 and receiving 115 devices have the same, or different, software capabilities, including software applications and versions. Sending 110 and receiving 115 client devices can comprise a portable electronic device, such as a smart phone, a desktop computer, such as an Apple® iMac®, a tablet computer, such as an Apple® iPad®, or other computing device as described below with reference to FIG. 9.

Network 120 can be any type of network, such as Ethernet, Token Ring, Firewire, USB, BlueTooth, Fibre Channel, WiFi, IEEE 802.11g, 802.11n, 802.11ac, a cellular network such as LTE, UMTS, WiMAX or other network type.

Message system 130 can be any type of messaging system, such as a text message system, SMS message system, email message system, Apple® iMessage®, or Facebook® Messenger. Message system 130 can be implemented on one or more servers. An exemplary server is described below with reference to FIG. 9. Message system 130 can include an identity server 132 and a messaging server(s) 134. A user having an account with messaging system 130 can be registered with message system 130 via identity server 132. Identity server 132 can store information about a registered user that is useful to message system 130, such as the particular devices owned and used by the registered user, and the hardware and software capabilities of such devices. Message system 130 can access identity server 132 to determine hardware and software capabilities of senders and recipients of messages in the message system 130. Messaging server 134 can forward message(s) received from a sending client device 110 that are destined for one or more recipient devices 115. Message system 130 can be coupled to client devices 110 and 115 via network 120. Identity server 132 and messaging server(s) 134 can be coupled to messaging system 130 by network 120 or other network.

Figure 2A:
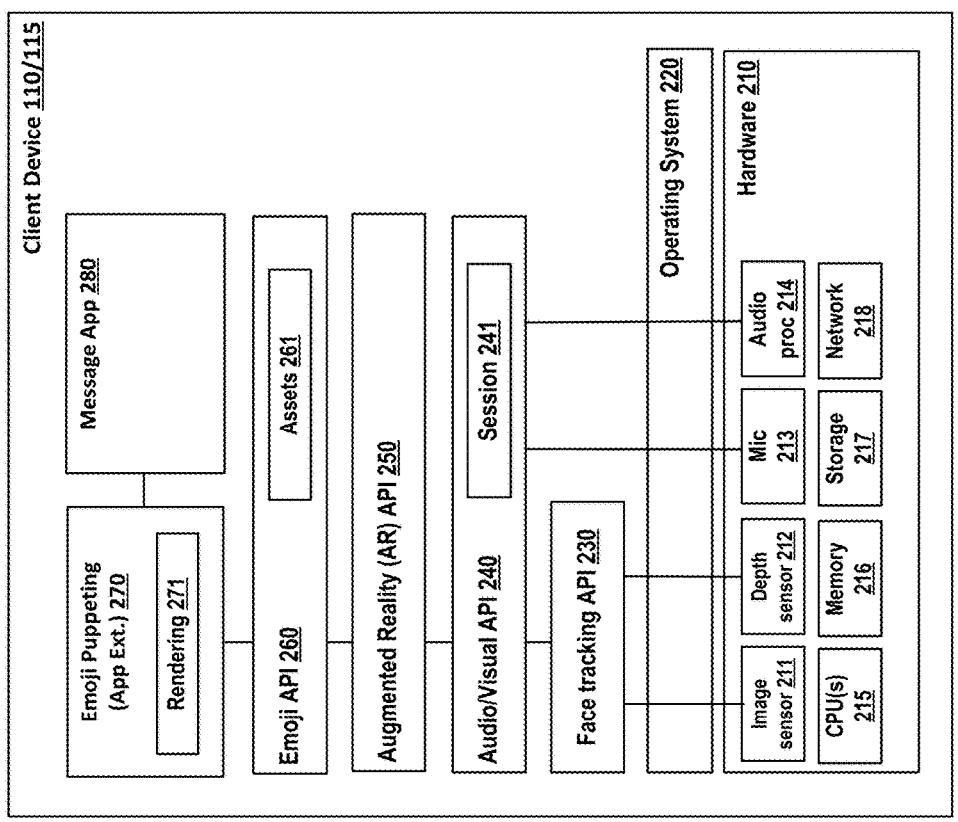
FIG. 2A illustrates, in block form, a detailed view of an exemplary client sending device in a system for generating a puppeted emoji for sending in a message to one or more message recipients, according to some embodiments.

FIG. 2A illustrates, in block form, a detailed view of an exemplary client sending device 110 in a system 100 for generating a puppeted emoji for sending in a message to one or more message recipients, according to some embodiments. Client receiving device 115 can have the same, similar, or different capabilities.

Internal components of client device 110 can include hardware 210, operating system 220, face tracking API 230, audio/visual (A/V) API 240, augmented reality (AR) API 250, emoji API 260, emoji puppeting application extension 270, and message application 280. An example API call is described below with reference to FIG. 8.

Hardware 210 can include a camera or image sensor 211, depth sensor 212, microphone 213, audio processor 214, one or more central processing units, or special processing units 215, memory 216, storage 217, and a network interface 218. Image sensor 211 can include a charge-coupled device (CCD) camera or other sensor that produces image data. Other sensor types can include an active pixel sensor in complementary metal-oxide-semiconductor (CMOS), N-type metal-oxide-semiconductor (NMOS or Live MOS) technology, or hybrid CCD/CMOS architecture consisting of CMOS readout integrated circuits (ROICs) that are bonded to a CCD imaging substrate. Image data can include red-green-blue (RGB) data, a pixel map at a resolution supported by the camera, intensity and pixel color information. Image information can be captured in other data formats including luminance (brightness) and chrominance (color) signals represented in, e.g., one luminance (Y') and two chrominance (UV) components, or in YCbCr, Y'CbCr, YPbPr or other format. Image sensor 211 can produce image data in frames having a frame rate, such as 60 frames per second (fps). Depth sensor 212 can include an infrared sensor that captures depth information having a pixel map each pixel having a depth value. Depth information can have a pixel resolution, such as 720 pixels/inch (720p). Depth information can be stored as frames of depth information having a frame rate, such as 15 fps. In an embodiment, both the RGB sensor 211 capture frame rate and the depth sensor 212 capture frame rate can be independently variable. In an embodiment, either or both the RGB capture frame rate and/or depth sensor capture frame rate can be reduced in response to, or as a function of, temperature or high energy consumption by the electronic device. The frame rate at which a puppeted emoji is rendered can be independently variable from the RGB sensor 211 capture frame rate and the depth sensor 212 capture frame rate. In an embodiment, depth sensor 212 can also comprise an image sensor that produces RGB image data. Microphone 213 can be any type of microphone, such as an electret (electro-static magnet) microphone having a ferroelectric electrically charged material. Audio processor 214 can include a digital signal processor (DSP), one or more analog-to-digital convertors, filters, amplifiers, and other components to receive and processor sound, e.g. from microphone 213, and generate frames of audio data from the received sound. Audio processor 214 can produce audio data in accordance with a sample rate, such as 44.1 KHz, 48 KHz, or other sample rate. CPU(s) 215, memory 216, storage 217, and network interface 218 are described in detail below with reference to FIG. 9.

Operating system 220 can be any type of operating system, such as Apple® iOS®, Unix®, Linux, Windows®, or other operating system. Operating system 220 can implement resources necessary to interface hardware 210 to user applications such as message application 280, application extensions e.g. emoji puppeting application extension 270, operating system services, and APIs, such as face tracking API 230, A/V API 240, AR API 250, and emoji API 260.

Face tracking API 230 can receive image information and depth information from, e.g., image sensor 211 and depth sensor 212. Face tracking API 230 can synchronize the image information and depth information in time, in frames. For example, image information can be received at 60 frames/second (fps), and depth information can be received at 15 fps, as described below with reference to FIG. 9. Face tracking API 230 can align these frames in time into key frames and interleaved frames. A key frame can include both depth information and image information and is interleaved in time by one or more image frames. In the example of 60 fps image information and 15 fps depth information, each key frame will be interleaved by three (3) image information frames. Depth and image information frames can be passed to, e.g. A/V API 240. In an embodiment, face tracking API 230 can interpolate depth information between key frames.

A/V API 240 can generate a recording session 241 in which image information, depth information, and/or audio information can be acquired and used to puppet an emoji. Audio information can be received from microphone 213 and/or audio processor 214. Audio information can include speech, or other sound, e.g. a dog barking, during an emoji puppeting session. A session 241 can be initiated in response to a call, from (e.g.) emoji puppeting application extension 270 or emoji API 260. In an embodiment, audio processor 214 can receive audio signal from microphone 213 and sample the microphone 214 output using an analog to digital convertor (ADC) of the audio processor 214. The ADC can have a sample rate of, e.g., 48 KHz, 10 KHz, or other sample rate. AV API 240 session 241 can pass depth and image frames to face tracking API 230. Face tracking API 230 can process these frames then output a pose, a mesh, and blend shape metadata to AV API 240 where it is synchronized and passed to AR API 250. Audio processor 214 or A/V API 240 can package the sampled audio data into chunks or frames corresponding to image information frames, e.g. 60 fps or depth information frames at 15 fps. A/V API 240 can synchronize the audio frames with the depth information and image information frames. Session 241 can store the synchronized image information, depth information, and audio information into e.g. memory 216 or storage 217. A/V API 240 can pass the image, depth, and audio information to AR API 250, emoji API 260, or emoji puppeting application extension 270 for further processing.

AR API 250 can use the image and depth information received from A/V API 240 or face tracking API 230 to generate a "mesh" data structure that represents the 3D depth profile of the face, and head, or other part of the object that is being used to puppet the emoji. AR API 250 can pass the mesh data structure to emoji API 260 or emoji puppeting application extension 270. A base mesh data structure can be generated from one or more frames of image and depth sensor information. Subsequent image and depth frames can be used to determine changes at one or more vertices of the base mesh, over the frames. On the base mesh, areas of interest, such as eyes, eye brows, smile, cheeks, ears, and forehead may change with facial expressions. One or more vertices of the base mesh can be grouped to represent each area of interest. The vertices in each area of interest can be mapped to one or more vertices in a corresponding area of interest in an emoji. In an embodiment, an expression-neutral base mesh of a 3D version of the emoji can be stored in assets 261 or emoji API 260. In an embodiment, the emoji can have a plurality of expressions each having a base mesh that represents the expression. An expression can be, e.g., eye blink-left, ear up-right, smile up-right, brow line down, and the like. Each expression base mesh can be termed a blend shape. For each expression, the difference between the expression-neutral base mesh, the scan of the user's face, and the expression base mesh can be termed a blend shape value. A blend shape value determines how much each blend shape is activated. The blend shape values can be used in animating the emoji. The blend shapes can be used to determine expressions of the user, or other object, that is puppeting the emoji. Another object can be, e.g. a dog, a bird, other pet, or animal.

Emoji API 260 has access to assets used to generate an animation and/or video of a puppeted emoji that can be looped back to the user while the user is composing a message. The user can select an alternate emoji from assets 261. An asset can include a library 261 including one or more emojis, each having been prepared for use in applying the base mesh data structure of the user to a selected one of the emoji. An emoji can have an associated "mesh" data structure having a large plurality of vertices. The vertices can be grouped into areas of interest or "landmarks" that will be mapped to one or more corresponding vertices of the base mesh data structure of the user generated from the image and depth information of the user. A large plurality can be, e.g. 500 vertices for the emoji, and a mesh data structure generated from image and depth information may have, e.g. 1000 or more vertices. Emoji API 260 can map the base mesh vertices of the user to the emoji vertices so that the emoji can be animated in accordance with the image and depth data used to generate the mesh data structure. Emoji API 260 can further generate blend shapes of the user's tracked face, each blend shape capturing an expression of the user's face, and map the blend shapes of the user's face to one or more blend shapes of an emoji, to enable the puppeting of the emoji. For example, the emoji can have a plurality of vertices corresponding to eyebrows, smile, ears, nose, or other feature of the emoji, and emoji API 260 can map the vertices of the mesh data structure to the corresponding emoji vertices. In an embodiment, the emoji can have a plurality of blend shapes each representing an expression of the eyebrows, smile, ears, nose, or other feature of the emoji, and emoji API 260 can map changes in the expressions of the user's face to one or more blend shapes of the emoji. Emoji API 260 can further add physical attributes derivable from motion detected in frames of image and depth information. For example, if the emoji is a dog, emoji API 260 can detect that the user's head moved in an up-and-down motion, or a side-to-side head-shaking motion, that would result in the dog's ears flapping in a manner that would result from the dog moving in the same manner as the user did. Then emoji API 260 can add an ear-flapping motion that corresponds to the detected motion. In addition, emoji API 260 can further detect, from the frames of image and depth information, that the user held a specific pose for a period of time. In response to detecting that the user held the pose, emoji API 260 can add a supplemental graphic to the emoji. For example, emoji API 260 can detect that the user held a frown for a predetermined period of time. In response to detecting the frown, emoji API 260 can add tears to the eyes of the puppeted emoji. In response to detecting a pose of a smile, emoji API 260 can, e.g., add hearts to the eyes of the dog to indicate happiness or positive affection. Emoji API 260 can further generate an animated version of the puppeted emoji, distinct from a fully rendered video of the puppeted emoji, for display to the user to enable the user to see approximately how the puppeted emoji will look when fully rendered.

Emoji puppeting application extension (app. ext.) 270 can be called by message application 280 to generate a puppeted emoji for sending in a message to one or more recipients, each having a receiving client device 115. Emoji puppeting app. ext. 270 can call one or more of the APIs described above, to enable the functionality of the emoji puppeting app. ext. 270. Emoji puppeting app. ext. 270 can receive the blend shapes, added graphical features, emoji, and mesh data structure from the APIs described above, and render 271 the puppeted emoji into a fully rendered video. Rendering 271 of the puppeted emoji by the sending client device 110 can be in accordance with the hardware and software capabilities of sending client device 110, and the hardware and software capabilities of the message recipient receiving client devices 115. Message system 130 can determine device capabilities the sender's client device 100 and of each recipient's receiving client device 115 from the list of recipients. In an embodiment, message system 130 has access to a database of details about the specific hardware and/or software installed on each of the sender, and recipient, client devices. Device capabilities can include hardware and software capabilities, and whether the recipient's receiving client device 115 supports display of a puppeted emoji in a message application. Message system 130 can notify sending client device 110 of specific versions of the puppeted emoji to render, and the recipient(s) that are to receive each version. Sending client device 110 can then render one or more different versions of the puppeted emoji in accordance with the versions indicated by the message system 130, for the corresponding message recipient(s) of the message that will contain the puppeted emoji. A rendered puppeted emoji can be encoded by the sending client device 110 as a video in any video encoding standard, such as but not limited to any MPEG standard, H.264, or H.265.

A Message application 280 can be an application such as Apple iMessage®, Facebook® Messenger, a text message application, an email application, or other message application. A user can select the emoji puppeting application extension 270 from within message application 280, to generate a puppeted emoji. The puppeted emoji can be included in a message sent from the message application 280 to one or more recipients.

Figure 2B:
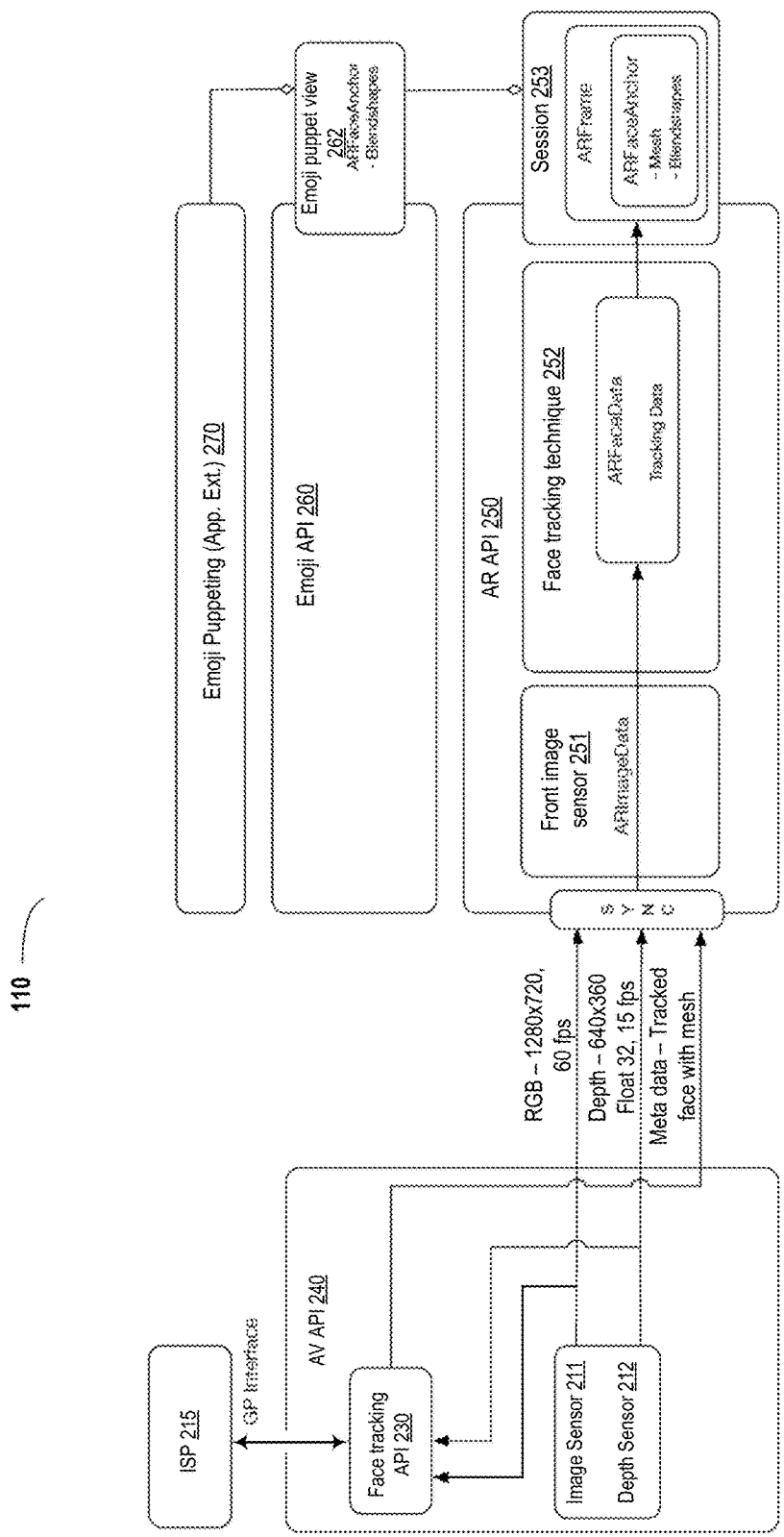
FIG. 2B illustrates, in block form, a detailed view of components of an exemplary client sending device in a system for generating a puppeted emoji for sending in a message to one or more message recipients, according to some embodiments.

FIG. 2B illustrates, in block form, a detailed view of another exemplary client sending device 110 in a system 100 for generating a puppeted emoji for sending in a message to one or more message recipients, according to some embodiments.

Internal components of client device 110 can include an image sensor 211 and a depth sensor 212. Image sensor 211 can generate image data, e.g. RGB color image data at 1280×720 pixels and 60 frames/second. Depth sensor 212 can generate depth data, e.g. 640×360 pixels of depth data at 32-bit floating point resolution and 15 frames/second. Image sensor 211 and depth sensor 212 can provide their respective sensor data to face tracking API 230 and to AR API 250. In an embodiment, depth sensor 212 can comprise an emitter and a sensor, wherein the depth sensor 212 emitter emits a scan-pattern of a beam, such as an infra-red laser beam, with each emitted beam in the scan-pattern corresponding to a vertice in a scan-space. The depth sensor can read an intensity of a reflection of each emitted scan beam in the scan pattern, reflected by the user's face. Image sensor 211 can also acquire image data of the user's face. Depth sensor information can be acquired and stored at a predetermined scan rate, e.g. 15 frames per second, during a recording time of the user's face. Image sensor information can be acquired and stored at a predetermined rate, e.g. 60 frames per second, during the recording time of the user's face. Face tracking API 230 can use general purpose interface (GP interface) to pass scanned depth and image information to image signal processor (ISP) 215 to execute convolution neural network (CNN) functionality, including deep learning for face tracking. CNN functionality can generate an expression-neutral base mesh for the user's face, and can detect changes in the user's facial expression(s) based upon changes in one or more vertices of the scanned image and depth information of the user's face. In an embodiment, CNN functionality can generate a base mesh for each of a plurality of expressions, and can estimate an amount of difference between the user's tracked face, the expression-neutral base mesh of the user's face, and each of the expression meshes. In an embodiment, CNN functionality can be implemented as an integrated circuit that can be trained to received RGB values captured from RGB sensor 211 and depth sensor values captured from depth sensor 212, and the trained model implemented by the CNN can output face tracking data to allow a face to be tracked over time. ISP 215 can comprise one or more processors, including a processor designed for image processing, a digital signal processor, a graphics processor, a general purpose processor, or other processor. ISP 215 can use the GP interface to return metadata to face tracking API 230. The returned metadata can be derived by the ISP 215 from the scanned depth and image information received from face tracking API 230 to ISP 215.

Initially, a first plurality of image scans can be used to detect the presence of the user's face. In an embodiment, both the image scans and depth sensors can be used to detect the presence of the user's face. In an embodiment, either, or both, of the image sensor or the depth sensor can be used to detect the presence of the user's face. Then image and depth scans can be used to "acquire" the user's face. Acquiring the user's face can include determining differences between a mesh of a generic face and a mesh of the user's face generated from the scanned depth and image information of the user's face. The mesh that represents a generic face can be termed an "identity" face. Scanned depth and image information of the user's face can be used to determine a mesh that represents the user's face. A mesh that represents the user's face can be termed a base mesh or "profile" face. The profile face mesh can be an expression-neutral mesh of the user's face. In addition to the profile face mesh, a plurality of expression meshes can be generated of the user's face.

Expressions can include, smile-left, smile-right, eye blink-left, eye-blink right, jaw-open, jaw-left, jaw-right, eye open-left, eye open-right, brow down-left, brow up-left, brow down-right, brow down-right, ear up-left, ear down-left, ear up-right, ear down-right, mouth smile-left, mouth smile-right, etc. Each expression mesh can be an estimated maximum deformation from the expression-neutral profile mesh for a particular facial expression. For example, a smile expression mesh can represent a maximum deformation of one or more portions of the face, as measured from the expression-neutral profile mesh, to generate a maximum estimated smile expression for the user. A face tracking algorithm can estimate, for each expression mesh, a difference value of the user's scanned face as compared to the expression-neutral profile mesh and the expression mesh for the expression. The difference value for each expression may be a scalar value such as 0 . . . 1, 0 . . . 255, 0% . . . 100%, or other scalar range. An estimated difference between a scanned face, an expression-neutral profile mesh of scanned face, and an expression base mesh can be termed a blend shape. The scalar value for the amount of difference between the scanned face, the expression-neutral base mesh, and the expression base mesh for an expression can be termed a blend shape value. One or more blend shapes can be mapped to one or more corresponding expression meshes on an emoji. The blend shapes values of the user's scanned face can be applied to the emoji in accordance with the blend shape value for each blend shape.

In an embodiment, metadata can represent differences between the identity face and the profile face, that express the profile face as differences between vertices of the identity face and corresponding vertices of the profile face. Differences can be expressed as a percent change, such as 0 . . . 100%, or, e.g., an 8-bit value 0 . . . 255 indicating an amount of change between corresponding vertices of the identity mesh and profile mesh. After the user's face has been detected and acquired, metadata of subsequent scans of the user's face can be expressed as difference values between the base mesh (profile face) for the user and any particular subsequent scan of the user's face. Again, differences can be represented as a percentage change, such as 0 . . . 100%, or as a scalar value having a range, such as 0 . . . 255 (byte value). The difference values can be used to determine changes in a "skin" that corresponds with high accuracy to the user's face for each scan of depth and image data of the user's face.

Face tracking API 230 can process the image sensor data and depth sensor data and package the sensor data in frames. AR API 250 can receive and synchronize frames of depth and image information. A frame of depth or image information can represent a scan of the depth or image information of the user's face at a particular point in time. In an embodiment, depth information can be scanned at, e.g., 15 frames per second (15 fps), while image information can be scanned at, e.g., 60 frames per second (60 fps). Synchronization of depth and image data is described in detail below with respect to FIG. 10. In an embodiment, frames are synchronized from a time, t0, that represents a starting time for collecting depth and image sensor data. In an embodiment, depth data, which is produced at, e.g., 15 frames/second, can be stored as 60 frames/second to align the depth data with the image data. In an embodiment, depth frames, which are received at, e.g., 15 frames/second, can be interpolated from 15 frames/second to 60 frames/second by averaging the changes between any two frames at 15 frames/second. Face tracking API 230 can generate a base mesh representing a face and/or head of user, from the image and depth sensor data. As additional frames of image and depth data are received, face tracking API 230 can determine differences between the base mesh and a mesh produced from the received image and depth frames. Differences can be determined per vertice of the base mesh. In an embodiment, face tracking API 230 can transmit to AR API 250, as frames of data and metadata, the base mesh and per-vertice differences derived from the received image and depth sensor frames.

Augmented reality (AR) API 250 can apply a face tracking technique 252 to the received frames to determine changes in the tracking points of the base mesh. Face tracking technique 252 can analyze metadata at a plurality of vertices of the mesh of the user's face to determine one or more activation points on the mesh. For example, if the metadata of a scan of the user's face indicates that for one or more vertices corresponding to a cheek, a lip, an eyelid, or other activation area, that the one or more vertices have changed value in a manner that indicates an expression (a wink, a blink, a kissing motion, a raised eyebrow, a smile, etc.), then face tracking technique 252 can indicate the expression in a data structure or "wrapper" as a frame of ARFaceData. AR API 250 can pass the ARFaceData to session 253.

Session 253 of AR API 250 can receive the ARFaceData, comprising base mesh, metadata per frame, and image and depth frame data. Session 253 can analyze the ARFaceData received from face tracking technique 252 to determine whether any expression information maps to one or more blend shapes of the emoji, and whether ARFaceData indicates an activation of an expression that triggers activation of one or more blend shapes of the emoji. Session 253 can package the ARFrameData, including the scanned mesh of the user's face, and any blend shapes detected by face tracking technique 252, into an ARFrame. Session 253 can pass the ARFrame to emoji puppet view 262 of emoji API 260. Emoji puppet view 262 can generate an animation of the puppeted emoji, separate from a rendered puppeted emoji video, during the recording of image and depth sensor data, for display to a user while recording.

Emoji API 260 can render one or more versions of a puppeted emoji video in accordance with the base mesh, metadata per frame, and image and depth frame information received from session 252.

Emoji puppeting application extension 270 can receive, or otherwise retrieve, the one or more versions of the rendered puppeted emoji video for sending to one or more message recipients.

Figure 3A:
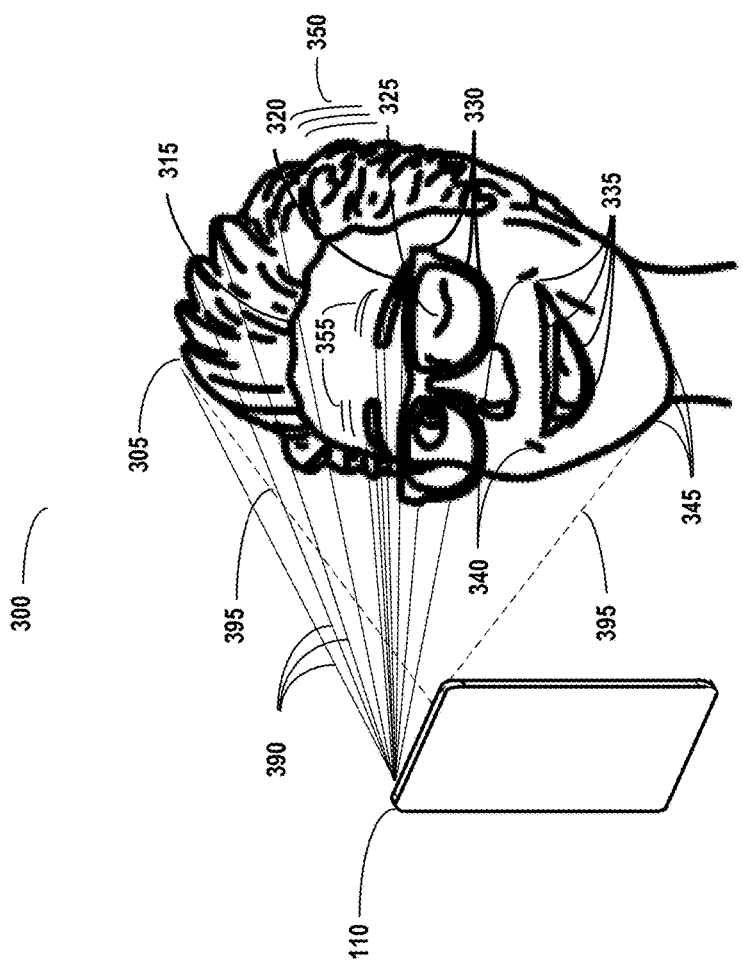
FIG. 3A illustrates an image sensor and a depth sensor gathering image information and depth information, respectively, from the face, expressions, movements, and head of a user of the sending client device, according to some embodiments.

FIG. 3A illustrates an image sensor and a depth sensor gathering image information and depth information, respectively, from the face, expressions, movements, and head of a user of the sending client device 110, according to some embodiments.

As described above, sending client device 110 can launch the emoji puppeting application extension 270 from within message application 280. Sending client device 110 can include image sensor 211 and a depth sensor 212 for capturing a plurality of frames of image information and depth information, respectively, over a period of time. In an embodiment, the period of time can be a predetermined period of time, such as 10 seconds.

Figure 3B:
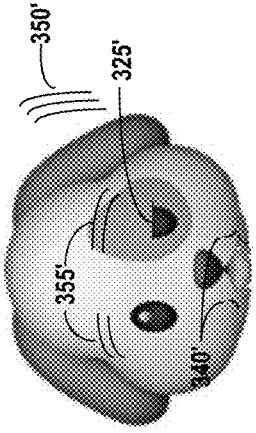
FIG. 3B illustrates a message transcript that includes a puppeted emoji received in a message from a sending client device.

Depth sensor 212 can detect detailed facial expression information by scanning the user face, head, and expressions, as represented by scan lines 390. Image sensor 211 can detect image information of the user face, head, and expressions in a series of captured frames having a view region 395. Depth sensor 212 scan lines 390 can include hair 305, hair line 315, eyebrows 320, eyelid 325, glasses frames 330, smile lines 335, dimples 340, and chin lines 345. Depth sensor scan lines 390 can further include motions of the face, head, or features of the face, such as a side-to-side motion 350, nodding, or up-down motion. The example scan lines are by way of example, and not limitation. Depth sensor 212 can capture a fine grid of scan depth information. The depth information can be analyzed by, e.g., AR API 250 to generate one or more mesh data structures that represents a profile of the user's face, expressions, and movement over a predetermined period of time. Emoji API 260 and/or rendering module 271 of emoji puppeting app. ext. 270 can apply the expressions and movements captured in the mesh data structures to puppet the emoji. For example, as shown in FIG. 3B, user movements can be applied to a dog emoji, to puppet the emoji to include a winking eye movement 325' corresponding to user eye wink 325, eyebrow movements 355', smile lines 340', and head movements 350' corresponding to user movements 355, 340, and 350 respectively. In an embodiment, the dog emoji, having long ears, can also be rendered to include his ears flapping in response to the head movement 350'. In an embodiment, emoji API 260 can detect that the user is holding a pose (e.g. smile) and generate and additional graphic, such as hearts in the emoji eyes, in response to detecting the smile pose of the user.

FIG. 3B illustrates a message transcript that includes a puppeted emoji received from a sending client device. When a user sends a message that includes a puppeted emoji, the puppeted emoji can appear in the transcript of the message, similar to other text and graphics that can appear in the transcript of a message session between a sending client device 110 and a receiving client device 115. The puppeted emoji, in this case a dog, can be animated or "puppeted" in accordance with the facial expressions and/or head movements of the user during recording of the image sensor 211 and depth sensor 212 data. For example, smile lines 340 on the user can be puppeted onto the emoji as smile lines 340'. Eyebrow movements 355 of the user can be puppeted onto the emoji as eyebrow movements 355'. Head movements 350 of the user can also be animated onto the emoji 350'. In an embodiment, additional special effects can be added, such as a flapping movement of the emoji's ears that may result from a real dog moving its head in a manner as the user did. The special effect can include other physical factors such as taking into account gravity upon the dog's ears, or wind.

Figure 3C:
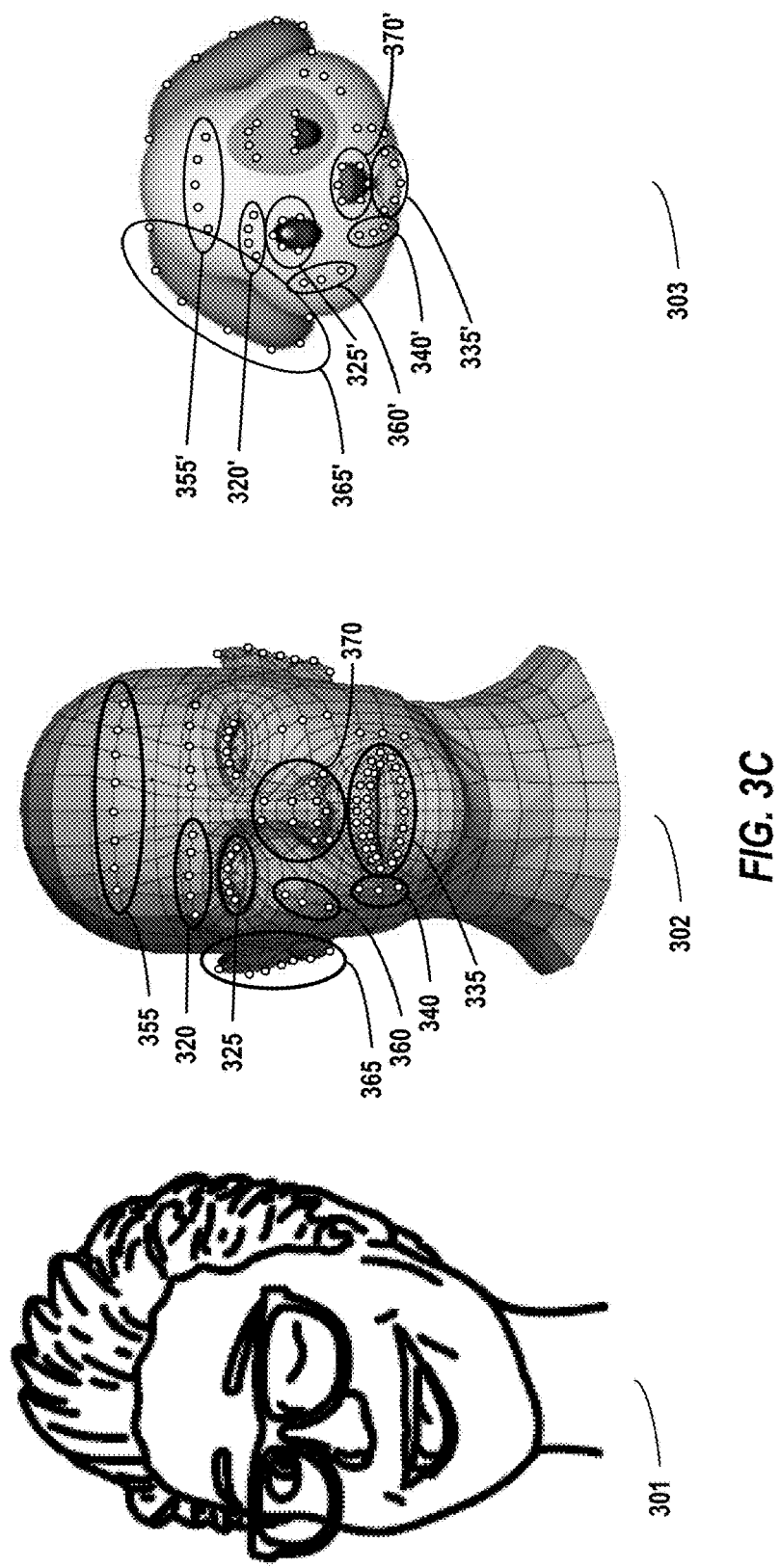
FIG. 3C illustrates a human face and head, a base mesh of the human face and head generated from image and depth data, one or more tracking points on the base mesh, and an emoji having tracking points corresponding to one or more of the base mesh tracking points.

FIG. 3C illustrates a human face and head 301 of a user, a mesh of a generic face 302 of the human face and head generated from one or more frames of image and depth data, one or more tracking points on the base mesh, each comprising one or more mesh vertices of the generic face, and an emoji 303 having tracking points corresponding to one or more of the base mesh 302 tracking points. The generic base mesh 302 can be used to generate an expression-neutral base mesh, or "profile mesh," of the user's face. In an embodiment, a plurality of expression base meshes can be generated that represent a particular expression. Each expression base mesh can represent a maximum estimated deformation of the expression-neutral base mesh for the expression, such as a forehead line 355, an eyebrow 320, an ear 325, or cheek line 360.

Using the profile face and image and depth information received by face tracking API 230, face tracking API 230 can generate a high resolution base mesh of the user's face and head. As additional frames of image and depth information are received, differences can be determined between the base mesh and the image and depth frames received. Differences can be tracked in groups termed landmarks. For example, a group of vertices around the flexible portion of the ear 365 can be tracked as a group for movement. Similarly, smile lines 340, mouth 335, cheek line 360, eyebrow 320, eyelids 325, and forehead 355 can each be tracked as a group of mesh vertices or landmarks. A base mesh of an emoji, e.g. a dog, can be stored in assets 261 of emoji API 260. Landmarks of the user base mesh can be mapped to corresponding landmarks of the emoji base mesh. In an embodiment, the base mesh of the user can have substantially more vertices than the base mesh of the emoji. In such case, a plurality of vertices of a landmark on the user base mesh may map to a lesser plurality vertices, or one vertice, on the emoji base mesh. In an embodiment, an amount of difference between an expression-neutral base mesh of the user and an expression base mesh for an expression can be expressed as a blend shape value. One or more blend shapes, and associated blend shape values, of the tracked user's face can be mapped to one or more blend shapes on an emoji to facilitate animating the emoji and rendering the puppeted emoji video.

Figure 4:
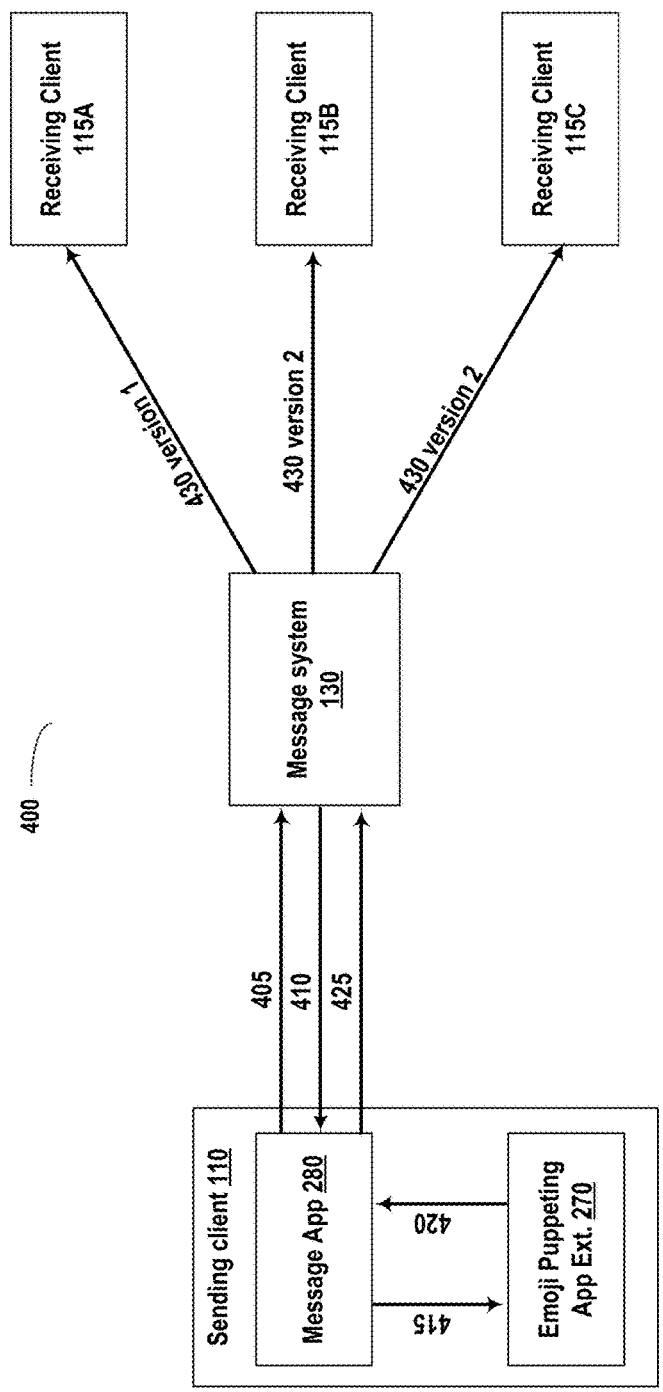
FIG. 4 illustrates a handshake between a sending client device, a message service, and receiving client device(s) when generating a puppeted emoji and sending the puppeted emoji in a message to the receiving client device(s), according to some embodiments.

FIG. 4 illustrates a handshake 400 between a sending client device 110, a message system 130, and receiving client device(s) 115 when sending client device 110 generates a puppeted emoji for sending in a message to the receiving client device(s) 115, according to some embodiments. Numbered arrows indicate communication flow between entities in the figure.

In communication 405, message application 280 of sending client device 110 can notify message system 130 that sending client device 110 is ready to send a message to one or more recipients. Communication 405 can include a list of recipients, an indication that the message will contain a puppeted emoji, and optionally an identification of the sender. In an embodiment, message system 130 can access identity server 132 (shown in FIG. 1) to lookup hardware associated with the sender and recipient(s), and determine the hardware and software capabilities of the sender and each recipient.

In communication 410, message system 130 can notify the sending client device 110 of one or more versions of the puppeted emoji that need to be rendered to meet the hardware and software capabilities of the recipient client devices 115. In an embodiment, message system 130 can detect whether the sending client device 110 is capable of producing any, or all, versions indicated by the message system 130 in communication 410. If, for example, one or more recipients have hardware or software of greater capability than the sending client device 110, then message system 130 can indicate in communication 410 only those versions of the puppeted emoji which the sending client device 110 is capable of rendering. A version may include rendering a video with audio, including a rich link that allows a recipient to receive and loop playback of the puppeted emoji. A version can alternatively include rendering a video with audio, including a metadata tag that indicates parameters for playback of the video. Either the rich link, or the metadata tag, and the puppeted emoji can be included within the message. The rich link can reference the puppeted emoji within the message. The rich link can further include parameters that determine how the emoji will be played back by the recipient receiving client device 115. The rich link, or the metadata tag, can include a length of the puppeted emoji video, a number of times to loop the video, whether the video should be muted during playback, etc. In an embodiment, the client sending device can store the rendered puppeted emoji video and the rich link can refer to a location where the rendered video is stored. The location can be the sending device, the message server, a third party server, cloud storage, or other storage location. A receiving client device 115 can access the puppeted emoji video by accessing the rich link. A version may include a video embedded in the message that can be viewed by a recipient when the message is received. In an embodiment, the version may include replaying the video in response to a user input. A version may include a pixel resolution, frame rate, or color depth supported by the recipient device(s) 115. In an embodiment, message 410 can include a public encryption key for each recipient of the message. Message 410 can further indicate which version of the rendered emoji is to be sent to which recipient.

In communication 415, message application 280 can call emoji puppeting application extension 270, which can in turn call rendering service 271 as shown in FIG. 2, to render the versions of the puppeted emoji indicated by the message system 130 communication 410.

In communication 420, emoji puppeting application extension 270 can generate one or more rendered versions of the puppeted emoji and make these versions available to message application 280. In an embodiment, emoji puppeting application extension 270 can return the rendered versions to message application 280 for sending to the message system 130. In an embodiment, emoji puppeting application extension 270 can return a link or memory address to a rendered version of the puppeted emoji to message application 280.

In communication 425, message application 280 can generate a message that includes a rendered version of the puppeted emoji that is appropriate for a recipient of the message and send the message to the message system 130. If a recipient's receiving client device 115 has the emoji puppeting application extension 270 installed, then message application 280 can further include a rich link to the puppeted emoji, or a metadata tag, that contains playback parameters of the puppeted emoji video. In an embodiment, message application 280 can use the public encryption key of each recipient, returned by message system 130, to encrypt the message, including the puppeted emoji, prior to sending the message to message system 130 for delivery to the recipient. Message application 280 can repeat this process for each recipient.

In communications 430, each message of the sending client device 110 can be sent by message system 130 to a recipient client devices 115A, 115B, 115C. In an embodiment, messaging server 134 performs the sending of each message to each recipient.

Figure 5A:
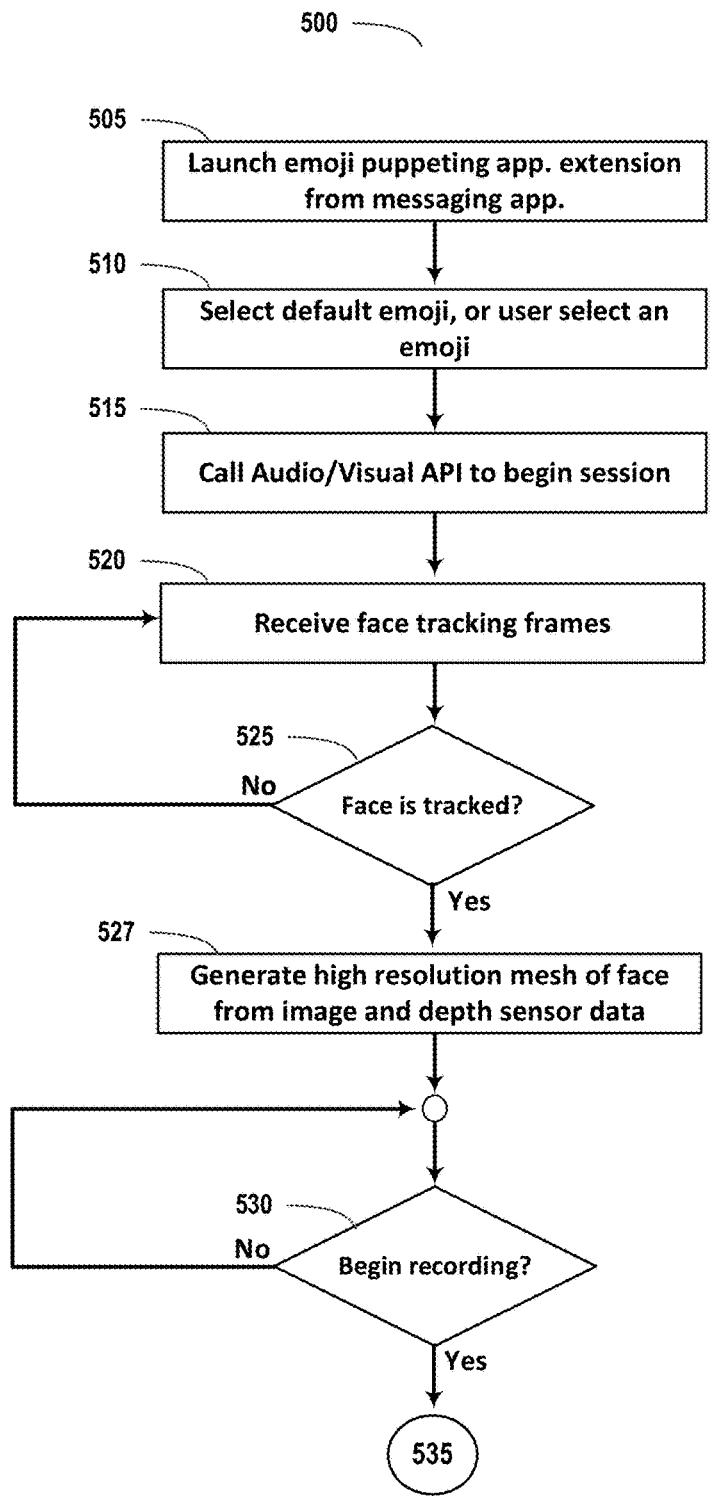
FIGS. 5A through 5C illustrate a method of a sending device generating a puppeted emoji video and sending the video in a message to a receiving device, according to some embodiments.
Figure 5B:
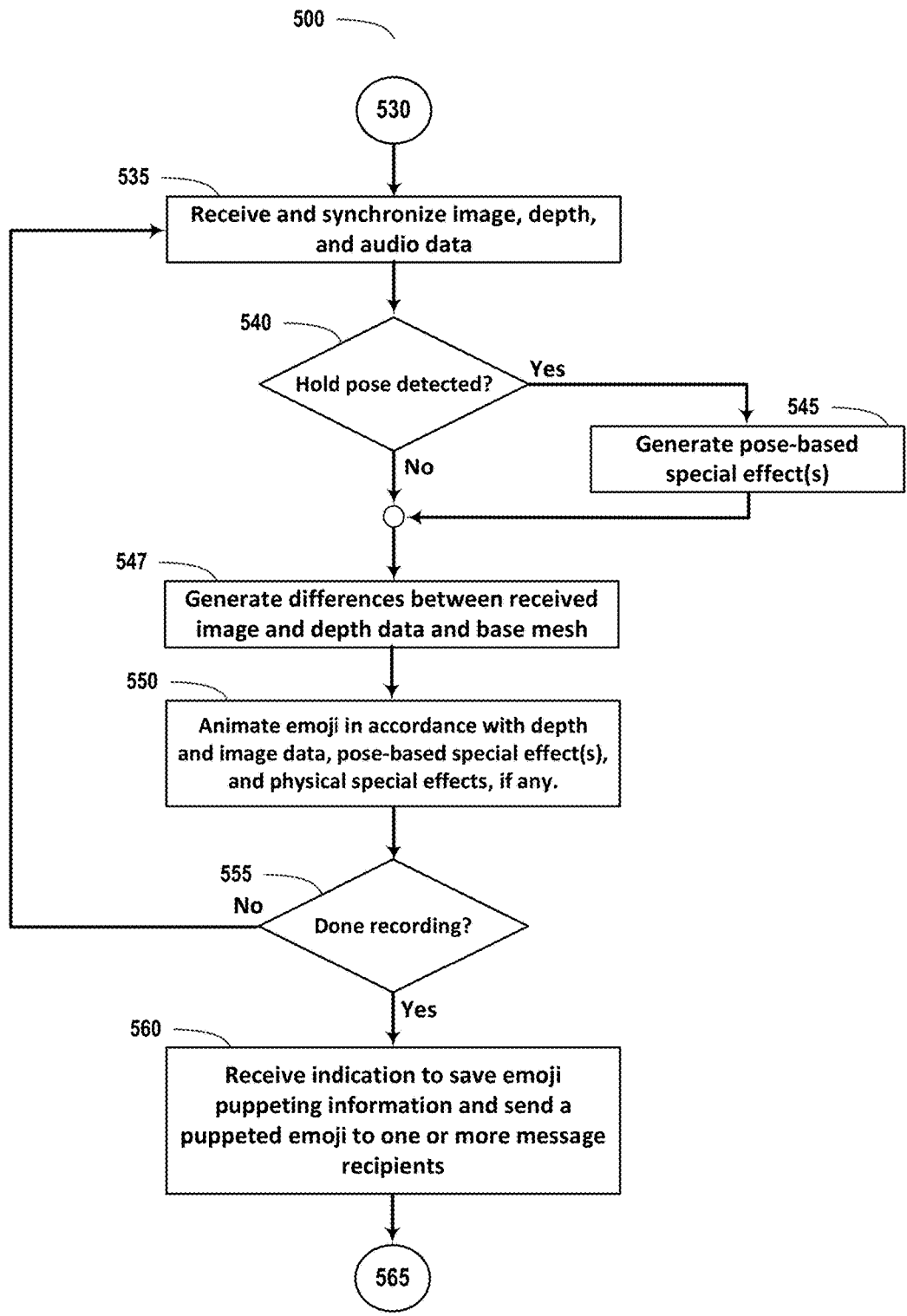
Figure 5C:
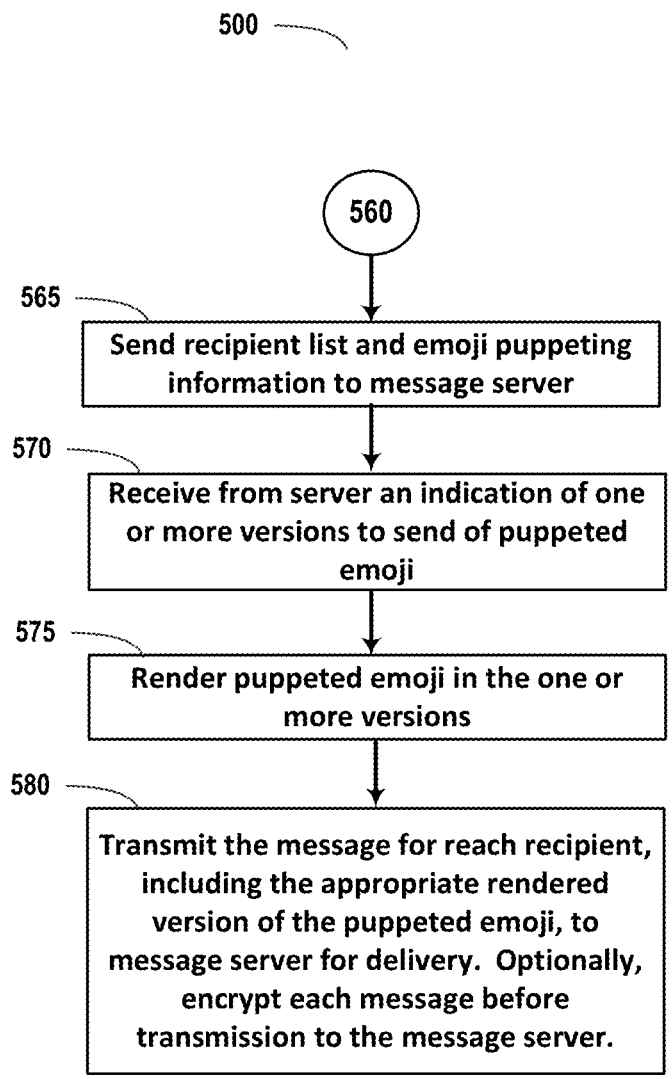

FIGS. 5A through 5C illustrate a method 500 of a sending client device 110 generating a puppeted emoji video and sending the video in a message to a receiving client device 115, according to some embodiments. FIG. 5A describes a process of initiating recording of a user's facial expressions, movements, etc. for use in puppeting an emoji for inclusion in a message. FIG. 5B describes a process of recording image, depth, and audio data for use in puppeting an emoji. FIG. 5C describes a process for sending a message that includes a puppeted emoji to one or more recipients each have a receiving client device 115.

With reference to FIG. 5A, in operation 505, a message application 280 can launch an emoji puppeting app. ext. 270. In an embodiment, emoji puppeting app. ext. 270 can be launched from within message application 280.

In operation 510, a default emoji can be selected, or a user can select an emoji from a list of displayed emojis, to be used for puppeting the emoji. In an embodiment, the default emoji can be a factory default emoji or the last emoji selected by the user. In response to the selection of an emoji, emoji puppeting app. ext. 270 can call emoji API 260 to retrieve the selected emoji from assets 261.

In operation 515, emoji puppeting app. ext. 270 can call A/V API 240 to initiate a session 241 for recording image, depth, and audio information for use in puppeting the selected emoji. In an embodiment, A/V API 240 can call face tracking API 230 to initialize hardware and driver software and to provision a recording session of image and depth information for the session 241. A/V API 240 can further make one or more operating system calls to initialize audio hardware and to provision a recording session of audio.

In operation 520, face tracking API 230 can begin acquiring one or more frames of depth and/or image information. Face tracking API 230 can determine whether the depth and/or image information indicates that the user's face, or other object, has been detected. In an embodiment, image sensor 211 and/or depth sensor 212 can determine that the user's face, or other object, has been detected. In embodiment, the user's face is determined to be detected in response to a hardware signal from a sensor indicating that the face has been detected. In an embodiment, the face is detected using the RGB sensor 211. In an embodiment, the depth sensor 212 can be in a powered off state during face detection, and powered on in response to the face being detected by the RGB sensor 211.

In operation 525, it can be determined whether the user's face, head, or other object, has been tracked (detected). If so, then method 500 continues at operation 527, otherwise method 500 continues at operation 520.

In operation 527, face tracking API 230 can generate use depth and image information to generate a high resolution base mesh of the user's face and/or head using one or more frames of image and depth information. In an embodiment, face tracking API 230 can generate an expression-neutral base mesh of the user's face and an expression base mesh for each of a plurality of expressions, such as a smile, an eye blink, ear movement, and the like. The user's face is then said to be "acquired."

In operation 530, it can be determined whether to begin recording image, depth, and audio data. Recording can begin after a predetermined amount of time has expired after tracking the user's head, face, or other object. In an embodiment, recording can begin in response to a user input. In an embodiment, recording can begin in response to detecting the user's voice or other predetermined sound, such as a verbal command to begin recording. If it is determined that recording is to begin, then method 500 continues at operation 535, which is described with reference to FIG. 5B. Otherwise method 500 continues at operation 530.

In FIG. 5B, operation 535, face tracking API 230 can receive and synchronize a plurality of frames of image and depth information. The plurality of frames of synchronized image and data information can be returned to A/V API 240 in association with a session. A/V API 240 can receive a plurality of frames of audio data from microphone 213 and/or audio processor 214. In an embodiment, the plurality of frames of audio data can be retrieved from audio processor 214 and/or microphone 213 in response to one or more calls to services of operating system 220. A/V API 240 or AR API 250 can synchronize the received audio frames of data with the plurality of frames of depth and image information received from face tracking API 230. A session, such as but not limited to session 241, can manage, store, and process the synchronized frames of audio, image, and depth information.

In operation 540, it can be determined whether the received plurality of frames of image and depth information indicate that the user is holding a pose for a threshold period of time. For example, 2 seconds or 120 frames. If so, then method 500 continues at operation 545, otherwise method 500 continues at operation 547.

In operation 545, the image and depth information can be further analyzed to determine whether the particular pose is recognized as one for which emoji API 260 has assets 261. If so, then A/V API 240, AR API 250, or emoji API 260 can generate a special graphic effect associated with the recognized pose. For example, if the recognized pose is a smile, the special graphic effect may be to add hearts to the eyes of the puppeted emoji. The hearts may further be animated, such as to pulsate or stream hearts from the puppeted emoji's eyes. Assets to perform a special graphic effect can be stored in assets 261. Method 500 continues at operation 550.

In operation 547, face tracking API 230 can generate differences between the base mesh of the user's face and/or head and received frames of image and depth data. In an embodiment, the differences can be expressed as a change magnitude value, e.g. 0 . . . 255, per-vertice of the base mesh. In an embodiment, differences at landmarks (groups of vertices) can be determined for the vertices in each landmark, in aggregate, and a value can be expressed for a blend shape for the landmark that represents the change in the landmark vertices. In an embodiment, face tracking API 230 can generate differences between the user's tracked face, an expression-neutral base mesh of the user's face and each of a plurality of expression base meshes to determine blend shapes for mapping to one or more corresponding blend shapes of an emoji.

In operation 550, emoji API 260 can animate a version of the puppeted emoji for display to a user, to indicate how a fully rendered version may look. Animation can include further special effects based on properties of the particular emoji. For example, a dog emoji may have long ears. If depth and image information indicates, e.g., an up-and-down or side-to-side motion of the user's head or face, then further animation can include a special graphical effect to animate the dog's ears to flap or move in accordance with the detected motion of the user.

In operation 555, it can be determined whether the recording has been completed. Recording can be completed when emoji puppeting application 270 receives an indication from the user to stop recording. In an embodiment, recording finishes at a predetermined period of time, such as 10 seconds. In an embodiment, recording finishes when no motion and/or sound has been detected from the image and depth information and/or the audio information for a predetermined period of time. In an embodiment, recording finishes when the user gives an audible to command to stop recording. In such case, the audio that is recorded can omit the command to stop recording. If it is determined that recording has finished, then method 500 continues at operation 560, otherwise method 500 continues at operation 535.

In operation 560, emoji puppeting app. ext., or message application 280, can receive an indication that the emoji puppeting information, including a plurality of synchronized frames of depth, image, and audio information, should be saved and the message containing a puppeted emoji should be sent to a plurality of message recipients. Method 500 continues at operation 565, described below with reference to FIG. 5C, which describes a process for sending a message with a puppeted emoji to one or more message recipients.

In FIG. 5C, operation 565, message application 280 can send a list of one or more message recipients and emoji puppeting information to message sever 130. In an embodiment, emoji puppeting app. ext. 270 can render a version of the puppeted emoji video for inclusion with the message to the message system 130. In an embodiment, the rendered version sent to the message system 130 is tailored to the hardware and software capabilities of the sending client device 110. In embodiment, the rendered version of the puppeted emoji sent to the message system 130 is the highest pixel density, color density, and frame rate that the sending client device 110 can produce. In an embodiment, the rendered puppeted emoji video comprises the highest pixel density, highest frame rate, highest number of colors, that the receiving client device 115 can reproduce.

In operation 570, message application 280 can receive from message system 130 an indication of one or more versions of the puppeted emoji to render for the one or more recipients. In an embodiment, it is possible that one or more of the message recipients is using an older version software or older hardware that will not produce a good user experience for the version of the puppeted emoji that the sending client device is capable of rendering. Message system 130 can determine the hardware and software capabilities of the receiving devices 115 and determine a version of the puppeted emoji that is suitable for the hardware and software capabilities of each recipient client device 115.

In operation 575, sending client device 110, emoji puppeting app. ext. 270 can render 271 the version(s) of the puppeted emoji video indicated by the message system 130 as being suitable for the recipient client devices 115. In an embodiment, each version rendered by the sending client device 110 can be rendered individually from the emoji, base mesh, and blend shapes produced from the frames of image and depth sensor data. In an embodiment, a highest pixel density, color, density and frame rate version of the puppeted emoji video can be rendered, then other versions indicated by the message system 130 as needed by a recipient of the message can be generated from the highest pixel density, color density, and frame rate version.

In operation 580, for each recipient message application 280 can transmit to the message system 130 the message and the version of the puppeted emoji video indicated by the message system 130 as being optimal for the receiving client device 115 of the one or more message recipients. Optionally, message application 280 can encrypt the message, including the puppeted emoji, using the public key of the recipient prior to sending the message to the message system 130 for forwarding to the message recipient.

Figure 6:
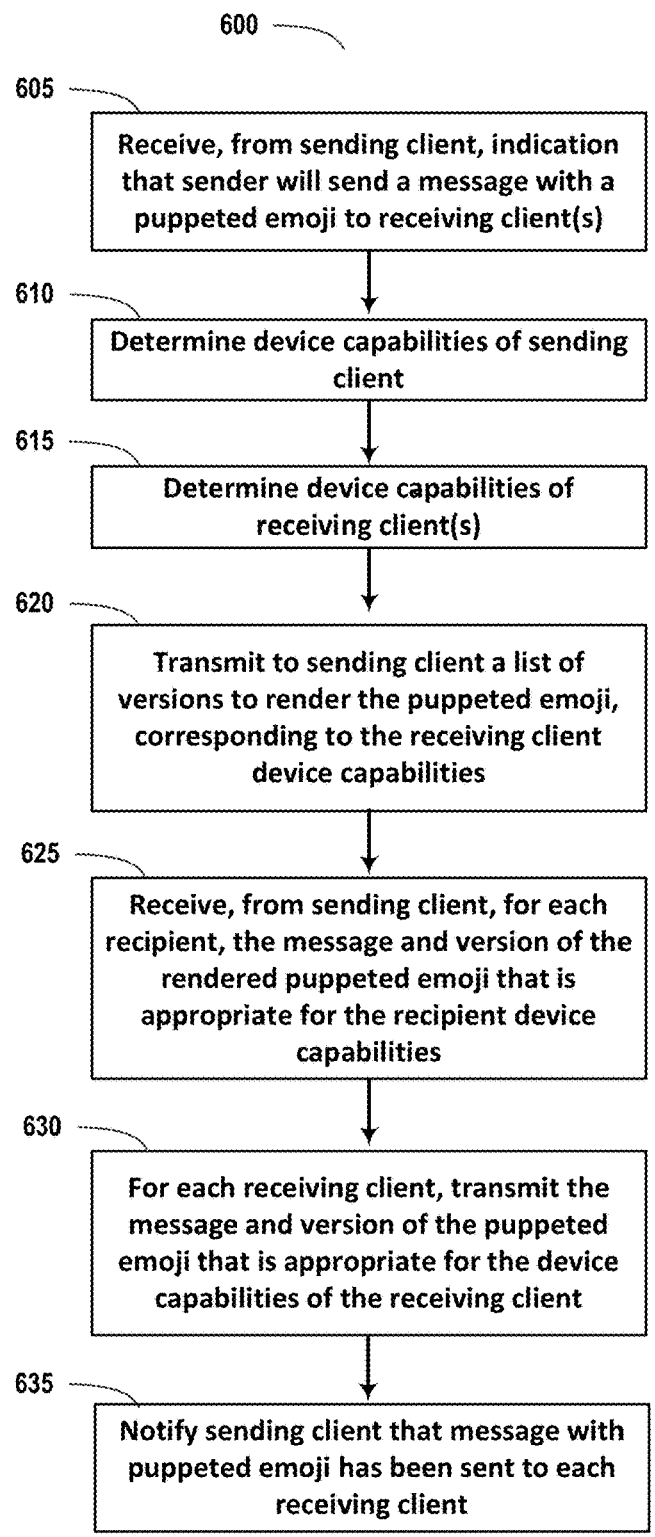
FIG. 6 illustrates a method of a server receiving a message having a puppeted emoji, and sending the message to one or more receiving devices, according to some embodiments.

FIG. 6 illustrates a method 600 of a message system 130 receiving a message having a puppeted emoji, and sending the message to one or more receiving devices 115, according to some embodiments.

In operation 605, message system 130 can receive from a sending client device 110 an indication that a user of the sending client device 110 wants to send a message to one or more message recipients, and an indication that the message will contain a puppeted emoji.

In operation 610, message system 130 can determine the hardware and software capabilities of the sending message device 110 to generate a rendered puppeted emoji.

In operation 615, message system 130 can similarly determine the hardware and software capabilities of the receiving client devices 115 of each of the one or more recipients. In an embodiment, each user of the message system 130 (including the sender and the recipients) is registered with the message system 130. The message system 130 can look up the hardware and software manufacturer, model, revision level, manufacturing data, current operating system version (e.g. Apple® iOS® 10, 9.1, or 8.3), installed software and version of the software, and other identifying information. Message system 130 can access a correlation table or database to determine the capabilities of the equipment of each recipient to receive and display a puppeted emoji.

In operation 620, message system 130 can transmit to sending client device 110, message application 280, a list of versions of the puppeted emoji to render, based on the hardware and software capabilities of the sending client device 110 and the receiving client devices 115 of the recipients of the message containing the puppeted emoji.

In operation 625, the message system 130 can receive, from the sending client device 110, a message for each recipient that includes to send to the recipient that includes the version of the rendered puppeted emoji video indicated by the message system 130 in operation 620.

In operation 630, for each recipient, the message system 130 can transmit the message and the appropriate version of the rendered puppeted emoji to the recipient.

In operation 635, message system 130 can transmit to sending client device 110 message application 280 a notification that the message and puppeted emoji was successfully sent to each message recipient.

Figure 7:
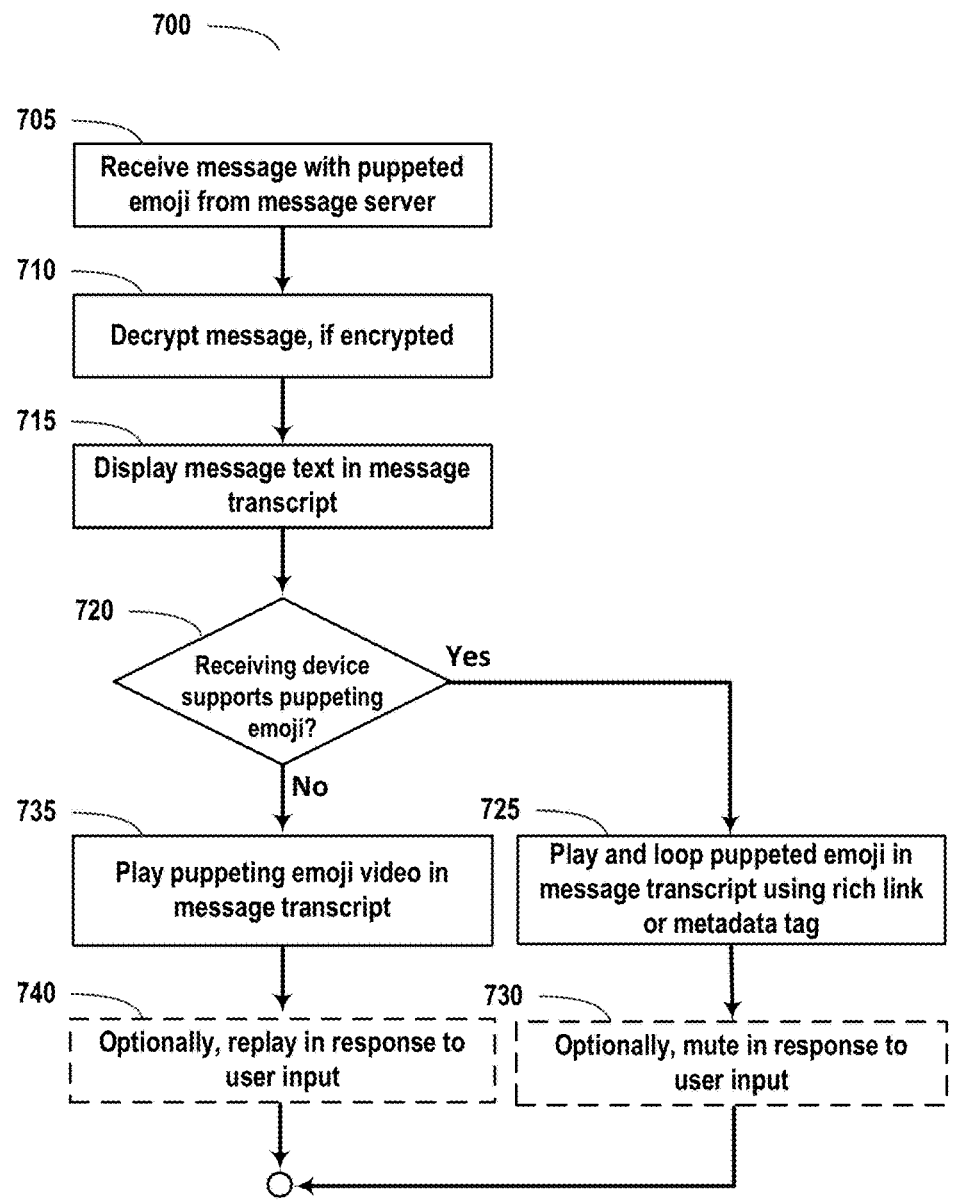
FIG. 7 illustrates, in block diagram form, a method of processing a message by a receiving client device, the message having a puppeted emoji, according to some embodiment.

FIG. 7 illustrates, in block diagram form, a method 700 of processing a message by a receiving client device 115, the message having a puppeted emoji, according to some embodiments. As described above, with reference to FIG. 6, message system 130 can determine device capabilities (hardware and software) for each message recipient. Message system 130 can transmit to sending client device 115 a message format, or version, to use that is supported by the receiving device 115 of each recipient. A message format can include transmitting message text, a puppeted emoji, and a rich link to the puppeted emoji video that the receiving client device 115 can use to display, loop, mute, and otherwise interact with, the puppeted emoji. In an embodiment, the client sending device can store the rendered puppeted emoji video and the rich link can refer to a location that the rendered video is stored. The location can be the sending device, the message server, a third party server, cloud storage, or other storage location. A receiving client can access the puppeted emoji video by accessing the rich link. Alternatively, a message format can include the puppeted emoji video and a metadata tag that includes playback parameters for the puppeted emoji video. The message format can further include whether the message is to be encrypted before sending to the message server (end-to-end encryption). In an embodiment, the message format can comprise embedding the puppeted emoji video into the message to be sent to the recipient, without a rich link to the embedded video.

In operation 705, receiving client device 115 can receive a message containing a puppeted emoji video from message system 130, from sending client device 110.

In operation 710, receiving client device 115 message application 280 can decrypt the received message, if it is encrypted. In embodiment, wherein the sending and receiving client devices use end-to-end encryption, sending device 110 can encrypt the message using a public key of the recipient, and the receiving device 115 can decrypt the message using a corresponding private key of the recipient. In an embodiment, end-to-end encryption can be implemented using a shared symmetric key or other security scheme. In an embodiment wherein the sending and receiving client devices do not use end-to-end encryption, the decryption at the recipient client is not performed.

In operation 715, receiving client device 115 can display message text, if any, in a transcript of a message session between sending and receiving client devices.

In operation 720, it can be determined whether the receiving client device 115 supports puppeting an emoji. A device that supports puppeting an emoji can have an emoji puppeting application extension 270 that facilitates emoji puppeting functionality. Such a device can support using a rich link, or metadata tag, with playback parameters to display the puppeted emoji, loop the emoji, and allow the user to mute or unmute the emoji.

If in operation 720 it is determined that the receiving client device 115 supports puppeted emojis, then method 700 continue at operation 725, otherwise method 700 continues at operation 735.

In operation 725, the puppeted emoji can be played on the message application 280 display area within a transcript of the message session between the sender and recipient, and playback any associated audio recorded with the puppeted emoji. In an embodiment, the puppeted emoji can loop indefinitely.

In operation 730, the puppeted emoji audio can optionally be muted in response to a user input. In response the user input can be input into a user interface of the emoji puppeting application extension 270.

In operation 735, wherein the receiving device does not support emoji puppeting, the video of the puppeted emoji retrieved from the message can be played back on the display of the receiving device. In an embodiment, the playback is within a message transcript of a message session between the sender and recipient. In embodiment, audio can be also played back with the video of the puppeted emoji. In an embodiment, the puppeted emoji video plays only once.

In operation 740, the puppeted emoji video can optionally be replayed in response to a user input. In an embodiment, the user input can be an input into a user interface of the emoji puppeting application extension.

Figure 8:
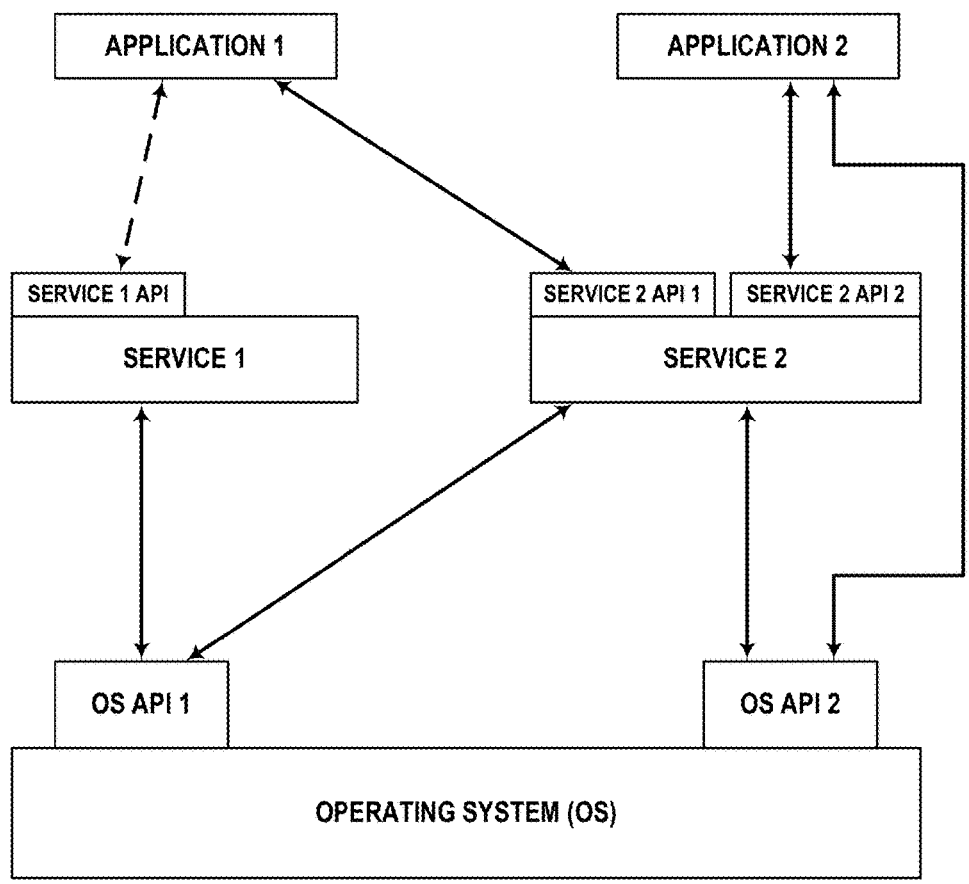
FIG. 8 illustrates an exemplary embodiment of a software stack usable in some embodiments of the invention.

In FIG. 8 ("Software Stack"), an exemplary embodiment, applications can make calls to Services 1 or 2 using several Service APIs and to Operating System (OS) using several OS APIs. Services 1 and 2 can make calls to OS using several OS APIs. Face tracking API 230, audio/visual (A/V) API 240, augmented reality (AR) API 250, emoji API 260 can be implemented in accordance with a software stack as described below.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 9:
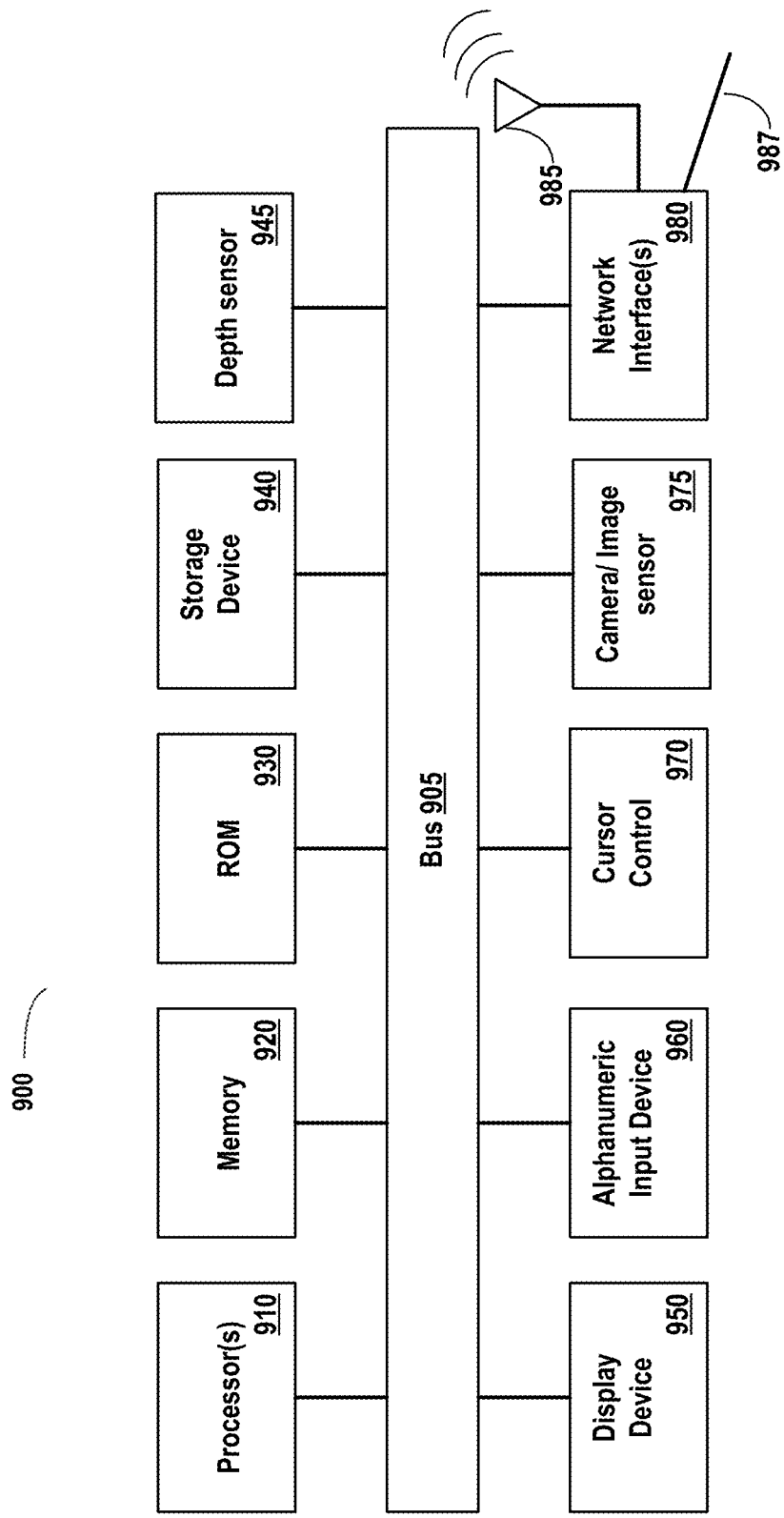
FIG. 9 is a block diagram of one embodiment of a computing system.

FIG. 9 is a block diagram of one embodiment of a computing system 900. The computing system illustrated in FIG. 9 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide the computing device and/or the server device.

Computing system 900 includes bus 905 or other communication device to communicate information, and processor 910 coupled to bus 905 that may process information.

While computing system 900 is illustrated with a single processor, computing system 900 may include multiple processors and/or co-processors 910. Computing system 900 further may include random access memory (RAM) or other dynamic storage device 920 (referred to as main memory), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) and/or other static storage device 940 coupled to bus 905 that may store static information and instructions for processor(s) 910. Data storage device 940 may be coupled to bus 905 to store information and instructions. Data storage device 940 such as flash memory or a magnetic disk or optical disc and corresponding drive may be coupled to computing system 900.

Computing system 900 may further include a depth sensor 945 coupled to bus 905. Depth sensor 945 can comprise an infrared sensor that can record 15 frames per second (fps), and an RGB sensor that can record 60 fps of red-green-blue (RGB) data at 720 pixels per inch. Distance range can be 20 to 60 cm (8 to 24 inches). Depth sensor 945 can produce frames of data at 60 fps, comprising key frames at 15 fps, interleaved with RGB frames at 60 fps. Key frames can comprise both infrared depth data and RGB depth data.

Computing system 900 can further include a camera 975 that captures image data in RGB format at, e.g. 60 fps. Images can alternatively be captured using luminance (brightness) and chrominance (color) signals represented in, e.g., one luminance (Y') and two chrominance (UV) components, or in YCbCr, Y'CbCr, YPbPr or other format. Camera 975 can include a charge-coupled device (CCD) sensor, an active pixel sensor in complementary metal-oxide-semiconductor (CMOS), N-type metal-oxide-semiconductor (NMOS or Live MOS) technology, or hybrid CCD/CMOS architecture consisting of CMOS readout integrated circuits (ROICs) that are bonded to a CCD imaging substrate. Camera 975 can supplement the RGB data captured by depth sensor 945. In an embodiment, RGB data captured by camera 975 RGB data can be used in lieu of RGB data captured by depth sensor 945 for determining depth and image information.

Computing system 900 may also be coupled via bus 905 to display device 950, such as a liquid crystal display (LCD), light emitting diode (LED) display, or touch screen, to display information to a user. Computing system 900 can also include an alphanumeric input device 960, including alphanumeric and other keys, which may be coupled to bus 905 to communicate information and command selections to processor(s) 910. An alphanumeric keypad can be implemented as keypad images on a touch screen display. Another type of user input device is cursor control 970, such as a touchpad, a mouse, a trackball, touch screen input or cursor direction keys to communicate direction information and command selections to processor(s) 910 and to control cursor movement on display 950. Computing system 900 may also receive user input from a remote device that is communicatively coupled to computing system 900 via one or more network interfaces 980.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 10:
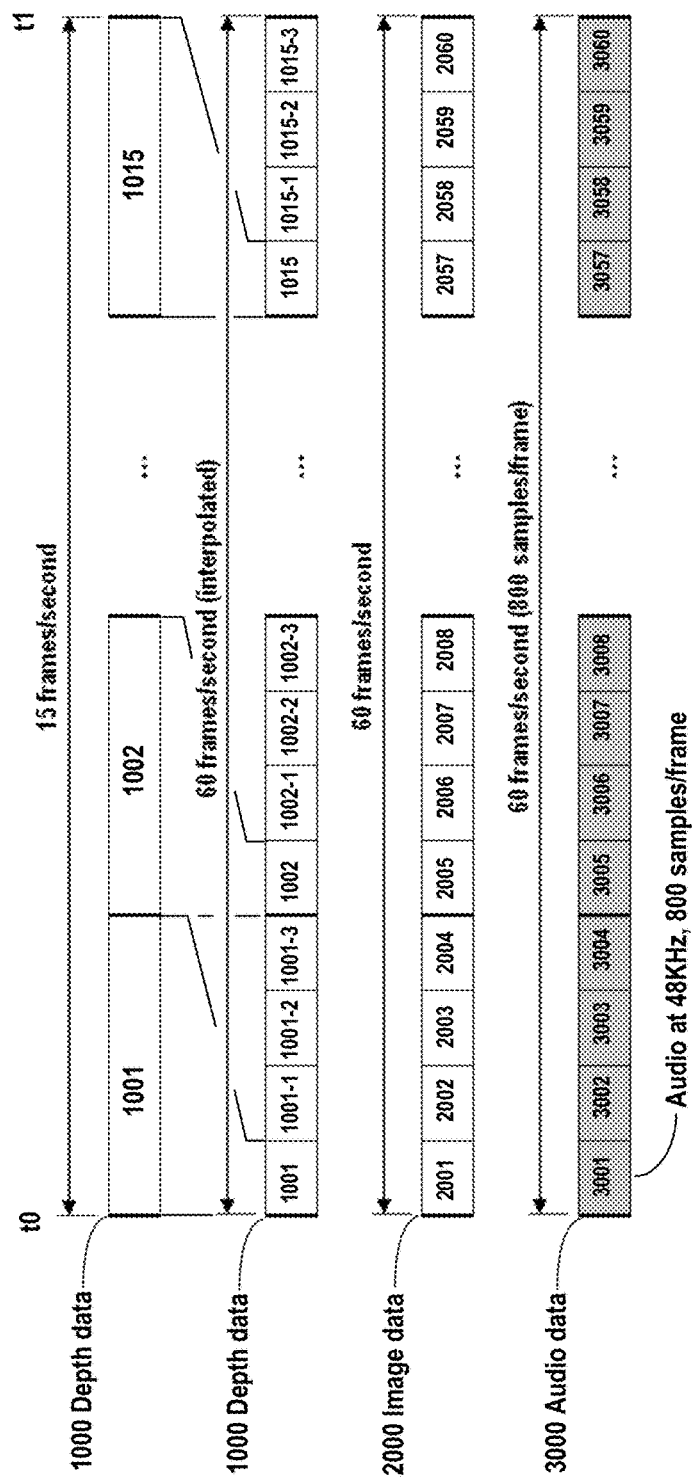
FIG. 10 illustrates synchronizing of image data frames, with depth data frames, and audio frames.

FIG. 10 illustrates synchronizing image data frames with depth data frames and audio data frames. At the alignment of a depth sensor frame and an image sensor frame, the combination of depth sensor and image sensor data can comprise a key frame. A key frame comprises depth sensor data that is not interpolated between frames. In the example below, depth data frame 1001 and image data frame 2001, e.g., comprise measured sensor data and, when combined, comprise a key frame. For purposes of illustrating synchronizing frames, the following example utilizes an RGB sensor 211 frame rate of 60 frames/second (fps) and a depth sensor frame rate of 15 fps. In an embodiment, both the RGB sensor 211 capture frame rate and the depth sensor 212 capture frame rate can be independently variable. In an embodiment, either or both the RGB capture frame rate and/or depth sensor capture frame rate can be reduced in response to, or as a function of, temperature or high energy consumption by the electronic device. RGB sensor data and depth sensor data can be synchronized into frames using the same principles as described below in the example of 60 fps RGB data and 15 fps depth data. The frame rate at which a puppeted emoji is rendered can be independently variable from the RGB sensor 211 capture frame rate and the depth sensor 212 capture frame rate.

Beginning at a time t0, depth sensor data 1000 can be received at, e.g., 15 frames per second (fps), with frames numbered, e.g. 1001 . . . 1015 for 1 second-worth of depth frame data.

Image sensor data 2000 may be received at a different frame rate, such as 60 fps, with frames numbered, e.g. 2001 . . . 2060.

Beginning at time t0, depth sensor data 1000 can be interpolated between each frame of the 15 fps dept sensor data. For example, a data structure can be generated to store depth sensor 1000 data at 60 fps. A first frame 1001 at t0, can be stored at 60 fps location 1001. A second 15 fps frame 1002 can be stored in the 60 fps data structure at 1002. Interpolated frames 1001-1, 1001-2, and 1001-3 can be generated by, e.g., averaging differences between the frame data of frame 1001 and 1002. In an embodiment, averaging differences between frames 1001 and 1002 can be at every depth data vertex in the frame data of frames 1001 and 1002. Likewise, frames 1002-1, 1002-2, and 1002-3 can be computed from averaging differences between frames 1002 and 1003.

Beginning at time t0, audio data can be sample by an audio processor coupled to, e.g., a microphone. In an embodiment, audio data can be sampled at 48 KHz. For an image data frame rate of 60 fps, 800 audio samples can be stored in association with each frame such that 60 fps of audio data comprises 1 second of 48 KHz sampled audio data. The specific frame rates for depth, image and audio data are by way of example only. Other frame rates can be used with depth or image data interpolated as appropriate between frames.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method practiced on a computing device comprising an image sensor and a depth sensor, the method comprising:
   receiving, using the depth sensor, a plurality of frames of depth information representing a head of a person that is changing with respect to time;
   receiving a plurality of frames of image information representing the head of the person;
   generating a video of an emoji in accordance with the plurality of frames of depth information and image information,
   wherein the image information and the depth information capture one or more facial expressions and movements of the head of the person, and
   wherein the generating comprises, for each of the one or more facial expressions,
      determining, using a machine learning model, an amount of difference between an expression-neutral base mesh of the head of the person and a facial expression base mesh of the head of the person corresponding to the image information and the depth information, and
      activating a corresponding facial expression of the emoji in accordance with the amount of difference; and
   transmitting the video of the emoji to one or more recipient computing devices.

2. The method of claim 1, wherein the generating comprises generating one or more versions of the video of the emoji in accordance with the plurality of frames of depth information and image information, the one or more versions corresponding to respective device capabilities of one or more recipient computing devices, and
   wherein the transmitting comprises transmitting the one or more versions of the video of the emoji to the one or more recipient computing devices based on at least one of the respective device capabilities or device capabilities of the computing device.

3. The method of claim 2, further comprising:
   transmitting, to a message service, a request to send the video of the emoji to the one or more recipient computing devices; and
   receiving, from the message service, a request to generate the one or more versions of the video of the emoji.

4. The method of claim 1, wherein the transmitting comprises:
   transmitting a metadata tag that enables the one or more recipient computing devices to loop playback of the video of the emoji multiple times.

5. The method of claim 1, wherein the plurality of frames of depth information and the plurality of frames of image information are synchronized, wherein the synchronization comprises aligning the plurality of frames of image information and depth information in time such that a frame of image information and a frame of depth information that are aligned in time comprise a key frame, and one or more key frames are interleaved by one or more image information frames.

6. The method of claim 1, wherein the video of the emoji is transmitted through a messaging system that includes one or more identity servers and one or more message servers.

7. At least one non-transitory computer readable medium programmed with instructions that, when executed by a processing system coupled to an image sensor and a depth sensor, perform operations, comprising:
   receiving, using the depth sensor, a plurality of frames of depth information representing a head of a person that is changing with respect to time;
   receiving a plurality of frames of image information representing the head of the person;
   generating a video of an emoji in accordance with the plurality of frames of depth information and image information
   wherein the image information and the depth information capture one or more facial expressions and movements of the head of the person, and
   wherein the generating comprises, for each of the one or more facial expressions,
      determining, using a machine learning model, an amount of difference between an expression-neutral base mesh of the head of the person and a facial expression base mesh of the head of the person corresponding to the image information and the depth information, and
      activating a corresponding facial expression of the emoji in accordance with the amount of difference; and
   transmitting the video of the emoji to one or more recipient computing devices.

8. The medium of claim 7, wherein the generating comprises generating two versions of the video of the emoji in accordance with the plurality of frames of depth information and image information, the two versions corresponding to respective device capabilities of two recipient computing devices, and
   wherein the transmitting comprises transmitting the two versions of the video of the emoji to two recipient computing devices based on the respective device capabilities.

9. The medium of claim 7, further comprising:
   generating a rich link for a first of the one or more recipient computing devices based on device capabilities of the first recipient computing device, the rich link referring to a storage location of the video of the emoji.

10. The medium of claim 7, wherein the plurality of frames of depth information and the plurality of frames of image information are synchronized, wherein the synchronization comprises aligning the plurality of frames of image information and depth information in time such that a frame of image information and a frame of depth information that are aligned in time comprise a key frame, and one or more key frames are interleaved by one or more image information frames.

11. The medium of claim 7, wherein the video of the emoji is transmitted through a messaging system that includes one or more identity servers and one or more message servers.

12. The medium of claim 7, the operations further comprising:
   receiving a plurality of frames of audio information associated with the head of the person; and
   aligning the plurality of frames of audio information in time with the plurality of frames of image information and depth information wherein the generating the video of the emoji comprises adding audio based on the plurality of audio frames.

13. A system comprising:
a processing system comprising a depth sensor and an image sensor, the processing system coupled to a memory programmed with executable instructions that, when executed by the processing system perform operations, the operations comprising:
receiving, using the depth sensor, a plurality of frames of depth information representing a head of a person that is changing with respect to time;
receiving a plurality of frames of image information representing the head of the person,
generating a video of an emoji based on the plurality of frames of depth information and image information,
wherein the image information and the depth information capture one or more facial expressions and movements of the head of the person, and
wherein the generating comprises, for each of the one or more facial expressions,
  determining, using a machine learning model, an amount of difference between an expression-neutral base mesh of the head of the person and a facial expression base mesh of the head of the person corresponding to the image information and the depth information, and
  activating a corresponding facial expression of the emoji in accordance with the amount of difference; and
transmitting the video of the emoji to one or more recipient computing devices.

14. The system of claim 13, the operations further comprising:
determining, based on the plurality of frames of depth information and image information, that a particular facial expression was held for a predetermined period of time; and
adding supplemental graphics to the video of the emoji based on the determination that the particular facial expression was held for the predetermined period of time.

15. The system of claim 14, wherein the transmitting comprises:
transmitting a metadata tag that enables the one or more recipient computing devices to loop playback of the video of the emoji multiple times.

16. The system of claim 13, wherein the plurality of frames of depth information and the plurality of frames of image information are synchronized, wherein the synchronization comprises aligning the plurality of frames of image information and depth information in time such that a frame of image information and a frame of depth information that are aligned in time comprise a key frame, and one or more key frames are interleaved by one or more image information frames.

17. The system of claim 13, wherein the video of the emoji is transmitted through a messaging system that includes one or more identity servers and one or more message servers.

18. The system of claim 13, the operations further comprising:
receiving a plurality of frames of audio information associated with the head of the person; and
aligning the plurality of frames of audio information in time with the plurality of frames of image information and depth information,
wherein generating the video of the emoji comprises adding audio based on the plurality of audio frames.

* * * * *